(12) United States Patent
Brady et al.

(10) Patent No.: US 11,427,403 B2
(45) Date of Patent: Aug. 30, 2022

(54) HIGH DENSITY, ROBOTIC WAREHOUSE SYSTEM

(71) Applicant: Amazon Technologies, Inc., Seattle, WA (US)

(72) Inventors: Tye Brady, Southborough, MA (US); Gregory Longtine, Sudbury, MA (US); Timothy Stallman, Groton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/035,114

(22) Filed: Sep. 28, 2020

(65) Prior Publication Data

US 2022/0097966 A1 Mar. 31, 2022

(51) Int. Cl.
*B65G 1/04* (2006.01)
*B65G 1/10* (2006.01)
*B65G 1/137* (2006.01)

(52) U.S. Cl.
CPC ............. *B65G 1/0492* (2013.01); *B65G 1/10* (2013.01); *B65G 1/1378* (2013.01)

(58) Field of Classification Search
CPC ................................ B65G 1/0492; B65G 1/10
See application file for complete search history.

(56) References Cited

U.S. PATENT DOCUMENTS

| 10,217,074 | B1 | 2/2019 | Stallman et al. | |
| 10,919,747 | B2 * | 2/2021 | Kalm | B66F 9/07 |
| 2014/0288696 | A1 | 9/2014 | Lert | |
| 2018/0079626 | A1 | 3/2018 | Brady et al. | |
| 2018/0082162 | A1 * | 3/2018 | Durham | G06Q 50/28 |

FOREIGN PATENT DOCUMENTS

| CA | 2795022 A1 | 10/2011 |
| CA | 2799871 A1 | 6/2013 |
| DE | 102010015054 A1 | 11/2011 |
| EP | 2607292 A1 | 6/2013 |
| EP | 3696116 A1 | 8/2020 |
| WO | 2018053236 A1 | 3/2018 |

OTHER PUBLICATIONS

International Search Report and Written Opinion dated Jan. 10, 2022, issued in corresponding International Application No. PCT/US2021/051954.

* cited by examiner

*Primary Examiner* — Saul Rodriguez
*Assistant Examiner* — Willie Berry, Jr.
(74) *Attorney, Agent, or Firm* — Athorus, PLLC

(57) ABSTRACT

High density, robotic warehouse systems and processes may include one or more blocks of a storage system, each block including a plurality of floors, and each floor including a plurality of storage grid locations for respective totes. A plurality of first robotic drive units may transfer barges carrying totes between various processing stations and the storage system. A plurality of second robotic drive units may operate within the storage system and traverse the storage grid locations using a plurality of highway grids and elevators to move totes between barges and storage grid locations. The freely movable robotic drive units, barges, and totes enable high flexibility, modularity, scalability, and serviceability of the high density, robotic warehouse systems.

19 Claims, 17 Drawing Sheets

HIGH DENSITY, ROBOTIC WAREHOUSE SYSTEM

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, storage, packing, shipping, or other processing of items within a material handling facility, often incur significant cost and time. Accordingly, there is a need for flexible and automated systems and methods to facilitate the various material handling processes within a material handling facility, thereby improving the speed and efficiency of such processes.

DETAILED DESCRIPTION

Figure 1:
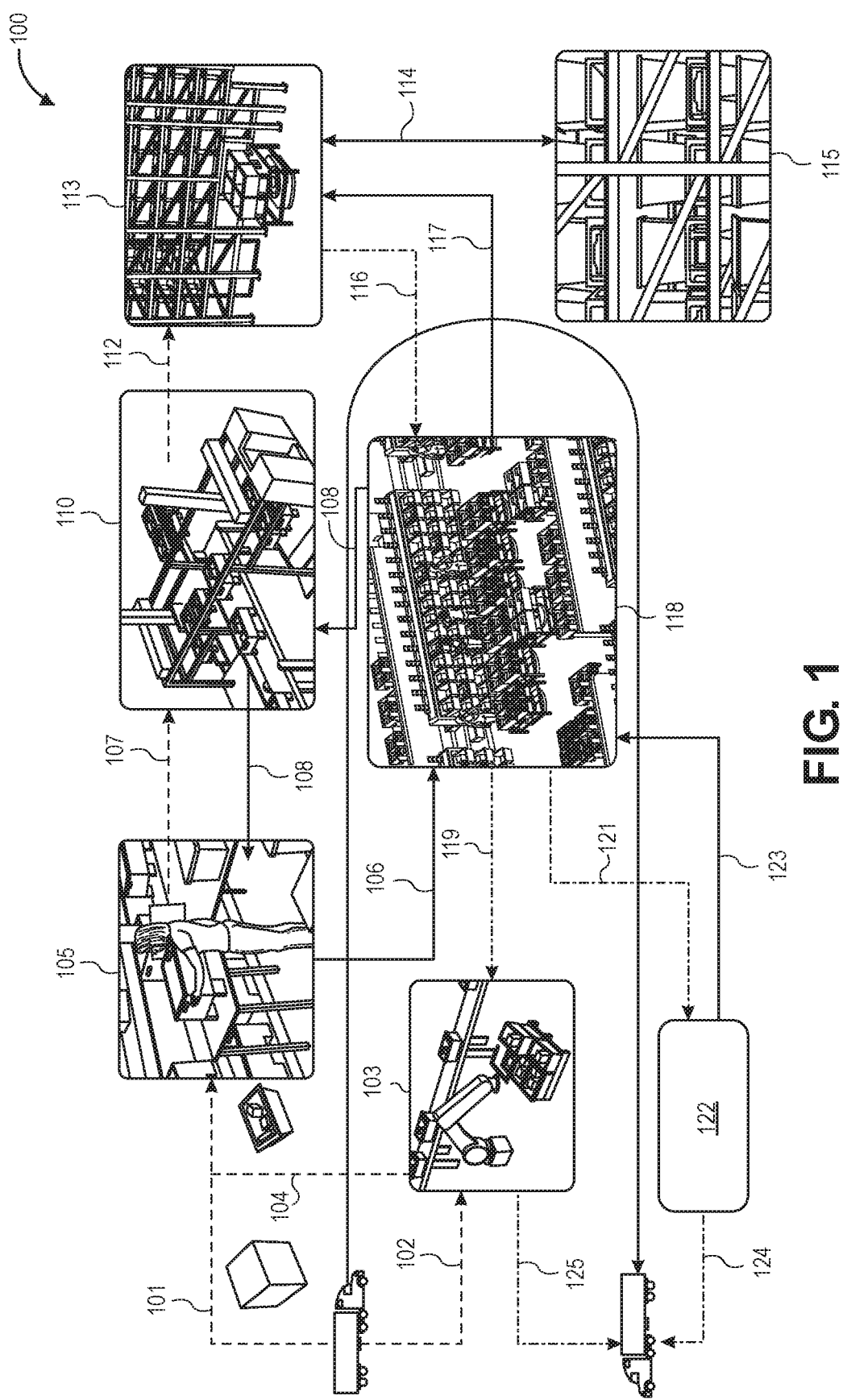
FIG. 1 is a schematic diagram of an example process flow utilizing a high density, robotic warehouse system, in accordance with implementations of the present disclosure.

As is set forth in greater detail below, implementations of the present disclosure are directed to warehouse storage systems and processes, using one or more robotic drive units, barges, and totes, that may be configured to increase storage density and throughput, while also improving flexibility, modularity, scalability, and serviceability associated with such warehouse storage systems and processes.

In example embodiments, the warehouse storage systems may include one or more blocks of shelving or racking systems, e.g., tear drop racking systems. Each block may include one or more floors or levels of shelves or racks that may be connected to each other via one or more elevators. In addition, each floor may include a plurality of storage grid locations connected via highway grids. Further, each storage grid location may be configured to receive a tote that may receive, contain, or carry one or more items or products, e.g., grocery, apparel, books, electronics, or various other types of items.

In addition, one or more processing stations, e.g., human-operated or automated stations, may process one or more items within the totes either upstream or downstream of the warehouse storage systems. Each processing station may be configured to perform one or more processes, including receiving or stowing items to totes associated with the shelving systems, loading or storing totes within the shelving systems, unloading or removing totes from the shelving systems, picking or placing items from totes associated with the shelving systems, sorting or storing groups of items, such as customer orders or transshipments, to order totes or transshipment totes, and/or various other processes. For example, the upstream processing stations may include item decant stations and/or barge loading stations, and the downstream processing stations may include item processing stations and/or barge unloading stations.

In example embodiments, one or more robotic drive units, e.g., barge drive units, may be configured to transfer barges carrying a plurality of totes, e.g., four totes each, between the warehouse storage systems and various upstream or downstream processing stations, e.g., using imaging sensors that detect fiducial markers placed on the floor, and/or using various other types of sensors to detect and determine positions within a material handling facility. In addition, the barge drive units may be configured to lift, move, and/or place barges at various upstream or downstream processing stations and/or at one or more docks associated with the warehouse storage systems. Further, the barge drive units may communicate with a controller or control system to send and/or receive instructions, commands, and/or data to coordinate operations of the barge drive units, mouse drive units, elevators, processing stations, and/or other components of the warehouse storage systems.

In additional example embodiments, one or more robotic drive units, e.g., mouse drive units, may be configured to traverse the docks, barges, blocks, floors, and storage grid locations of the shelving systems via the highway grids and/or elevators, e.g., using imaging sensors that detect fiducial markers placed on the floors, and/or using various other types of sensors to detect and determine positions within the shelving systems. In addition, the mouse drive units may be configured to lift, move, and/or place totes within the docks, barges, blocks, floors, and storage grid locations of the shelving systems. Further, the mouse drive units may communicate with a controller or control system to send and/or receive instructions, commands, and/or data to coordinate operations of the mouse drive units, barge drive units, elevators, processing stations, and/or other components of the warehouse storage systems.

In other example embodiments, the blocks, floors, and storage grid locations of the shelving systems may include one or more service access zones or areas, e.g., human-accessible or machine-accessible stairways, ladders, catwalks, or regions adjacent to or within the blocks, floors, storage grid locations, highway grids, and/or elevators. In this manner, each storage grid location, portion of a highway grid, and/or elevator within any block and/or floor of the shelving systems may be accessible for service during operation of the warehouse storage systems.

Using the warehouse storage systems and processes described herein, storage density within an environment, e.g., a material handling facility, may be increased by storing items to totes within multiple blocks, floors, and storage grid locations of shelving systems. In addition, throughput may be increased by utilizing multiple robotic drive units, e.g., mouse drive units, to move totes within the multiple blocks, floors, and storage grid locations of shelving systems, by utilizing multiple robotic drive units, e.g., barge drive units, to move totes between shelving systems and various processing stations, as well as by utilizing multiple processing stations to process items with respect to totes. Further, flexibility of warehouse storage systems and processes may be improved by utilizing substantially freely movable robotic drive units, e.g., mouse drive units, and totes within the multiple blocks, floors, and storage grid locations of shelving systems, and by utilizing substantially freely movable robotic drive units, e.g., barge drive units, barges, and totes between shelving systems and various processing stations. Moreover, modularity and scalability of warehouse storage systems and processes may be improved by adjusting or modifying size, scale, height, or numbers of blocks, floors, storage grid locations, highway grids, elevators, robotic drive units, docks, barges, and/or totes, and/or other parameters of the shelving systems and associated processing stations as desired. Furthermore, serviceability of warehouse storage systems and processes may be improved by providing access to substantially all portions of the multiple blocks, floors, and storage grid locations of shelving systems during operation of such systems.

FIG. 1 is a schematic diagram of an example process flow 100 utilizing a high density, robotic warehouse system, in accordance with implementations of the present disclosure.

As shown in FIG. 1, a plurality of items or products may be received into an environment, e.g., a warehouse, storage facility, or other building, using various material handling and/or conveyance equipment. The plurality of items may comprise cases, pallets, or other similar groups of items 101, as well as totes, bins, or other similar containers of items 102. The totes, bins, or containers 102 may comprise transship totes that have been transferred from one warehouse or facility to another warehouse or facility. In some example embodiments, the totes, bins, or containers 102 may be stacked onto a pallet when received, and the totes, bins, or containers 102 may be depalletized at a palletizing/depalletizing station 103 using manual, robotic, automated, or semi-automated processes. Then, individual, depalletized totes, bins, or containers 104 may be transferred downstream using various material handling and/or conveyance equipment.

At an item decant station 105, a plurality of items or products from cases 101 and/or totes 104 may be decanted into totes 107 that may be utilized within the high density, robotic warehouse system as described herein. The plurality of items may be decanted, sorted, or separated into totes 107 using manual, robotic, automated, or semi-automated processes. Then, the totes 107 having one or more items may move using various material handling and/or conveyance equipment to a barge loading/unloading station 110 to be loaded onto barges. The totes 107 may be loaded onto barges at the barge loading/unloading station 110 using manual, robotic, automated, or semi-automated processes. In addition, empty transship totes 106 from which items have been decanted may be routed to an item processing station 118 as described herein using various material handling and/or conveyance equipment.

After loading one or more totes 107 onto barges, the loaded barges 112 may be moved from the barge loading/unloading station 110 to the high density, robotic warehouse system by barge drive units. The barge drive units may move under, lift, and transport the loaded barges 112. In addition, the barge drive units may transport the loaded barges 112 to one or more docks 113 associated with the high density, robotic warehouse system.

Once the loaded barges 112 are placed at the docks 113, one or more mouse drive units may move and store individual totes 114 within the high density, robotic warehouse system 115. The mouse drive units may move onto the loaded barges 112, and may move under, lift, and transport the individual totes 114. Then, the mouse drive units may stow, sort, move, rearrange, and/or retrieve individual totes 114 within the high density, robotic warehouse system 115.

When one or more items are to be retrieved from the high density, robotic warehouse system 115, one or more mouse drive units may move and retrieve individual totes 114 from within the high density, robotic warehouse system 115. The mouse drive units may move under, lift, and transport the individual totes 114, and then may load the individual totes onto barges at one or more docks 113 associated with the high density, robotic warehouse system.

After loading one or more totes onto barges, the loaded barges 116 may be moved from the one or more docks 113 of the high density, robotic warehouse system to an item processing station 118 by barge drive units. The barge drive units may move under, lift, and transport the loaded barges 116. In addition, the barge drive units may transport the loaded barges 116 from one or more docks 113 associated with the high density, robotic warehouse system to one or more item processing stations 118.

At an item processing station 118, various processes or operations may be performed with respect to totes and/or items contained therein. For example, one or more items may be picked or removed from totes, and placed or transferred to transship totes 119 or order totes 121. The one or more items may be picked or removed from totes using manual, robotic, automated, or semi-automated processes.

Upon completion of processing of totes and/or items contained therein at an item processing station 118, the barges may be moved by barge drive units to either a barge loading/unloading station 110 or one or more docks 113 associated with the high density, robotic warehouse system. For example, if one or more totes carried by the barges and barge drive units are depleted or empty and/or need replenishment or consolidation, the empty totes 108 may be removed from the barges at the barge loading/unloading station 110 and transferred to an item decant station 105 using various material handling and/or conveyance equipment. In addition, if one or more totes carried by the barges and barge drive units are still substantially full and/or do not need replenishment or consolidation, the full totes 117 may be transported by the barges and barge drive units to one or more docks 113 to be stored within the high density, robotic warehouse system 115 by one or more mouse drive units.

The transship totes 119 may be routed to a palletizing/depalletizing station 103 using various material handling and/or conveyance equipment. At a palletizing/depalletizing station 103, the transship totes 119 may be palletized for transport using manual, robotic, automated, or semi-automated processes. Then, the palletized totes 125 may be transferred downstream, e.g., to shipping, using various material handling and/or conveyance equipment.

The order totes 121 may be routed to a pack station 122 using various material handling and/or conveyance equipment. At a pack station 122, one or more items within order totes 121 may be packed, boxed, labeled, or otherwise prepared for shipping to a destination, e.g., to a customer delivery location, using manual, robotic, automated, or semi-automated processes. Then, the packages 124 may be transferred downstream, e.g., to shipping, using various material handling and/or conveyance equipment. In addition, empty order totes 123 from which items have been removed and packed for shipping may be routed back to an item processing station 118 as described herein using various material handling and/or conveyance equipment.

Although FIG. 1 illustrates a particular sequence, configuration, and arrangement of a process flow utilizing a high density, robotic warehouse system, various modifications, additions, omissions, and/or changes may be made to the process flow while still utilizing the high density, robotic warehouse system. In other example embodiments, the high density, robotic warehouse system may be used in substantially different environments and/or in combination with substantially different upstream and/or downstream processes or operations than those illustrated and described with respect to FIG. 1.

Figure 2:
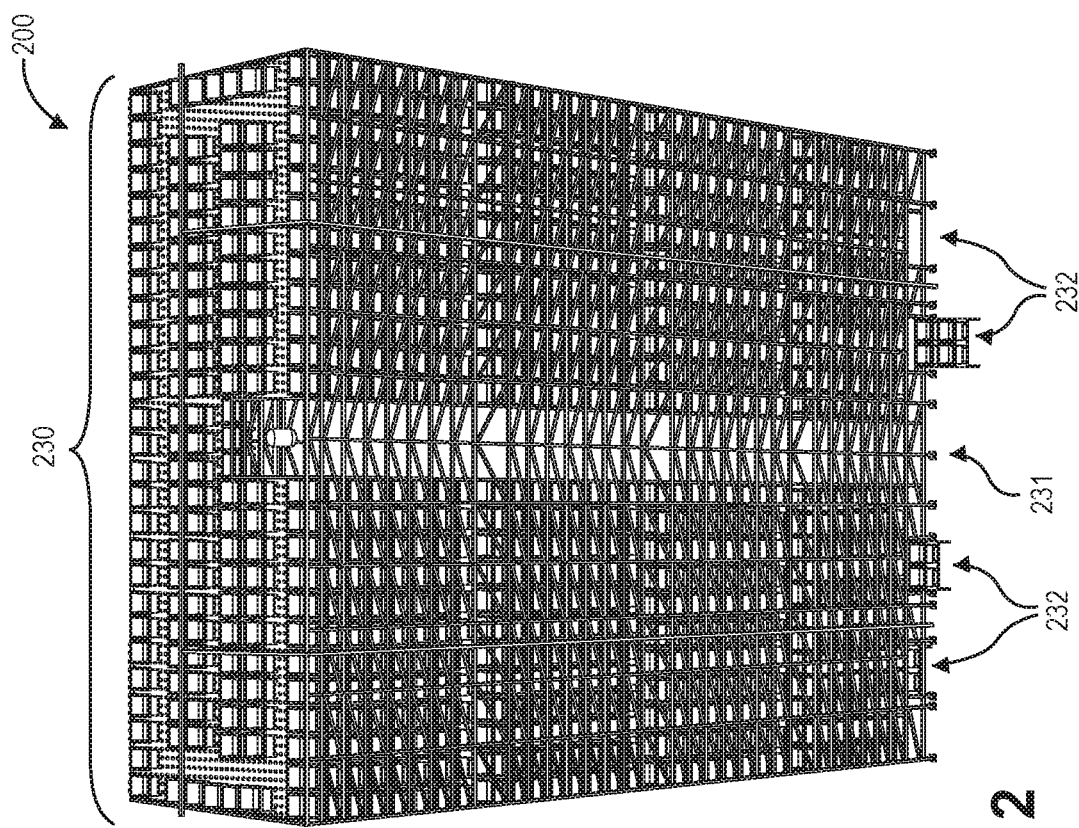
FIG. 2 is a schematic, upper perspective view diagram, and a partial, close-up view, of an example high density, robotic warehouse system, in accordance with implementations of the present disclosure.
Figure 2:
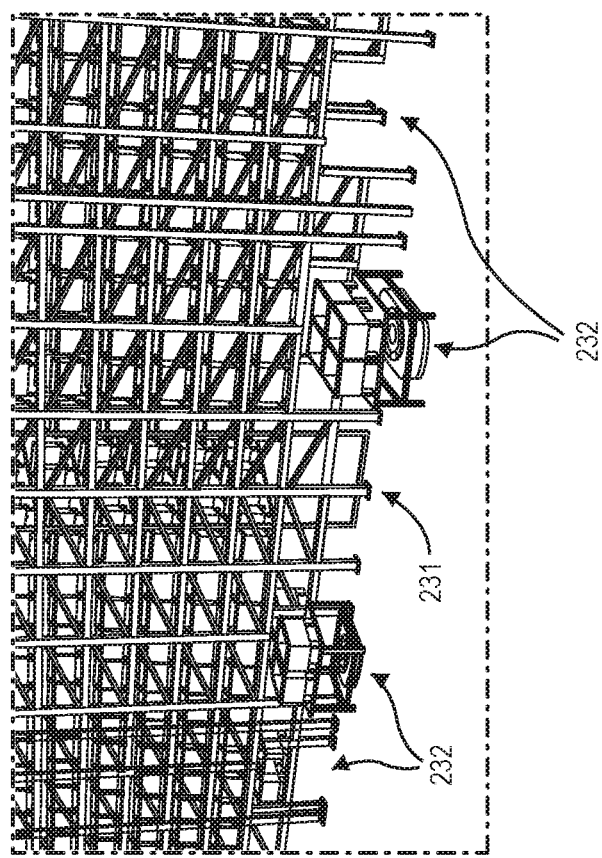
Figure 3:
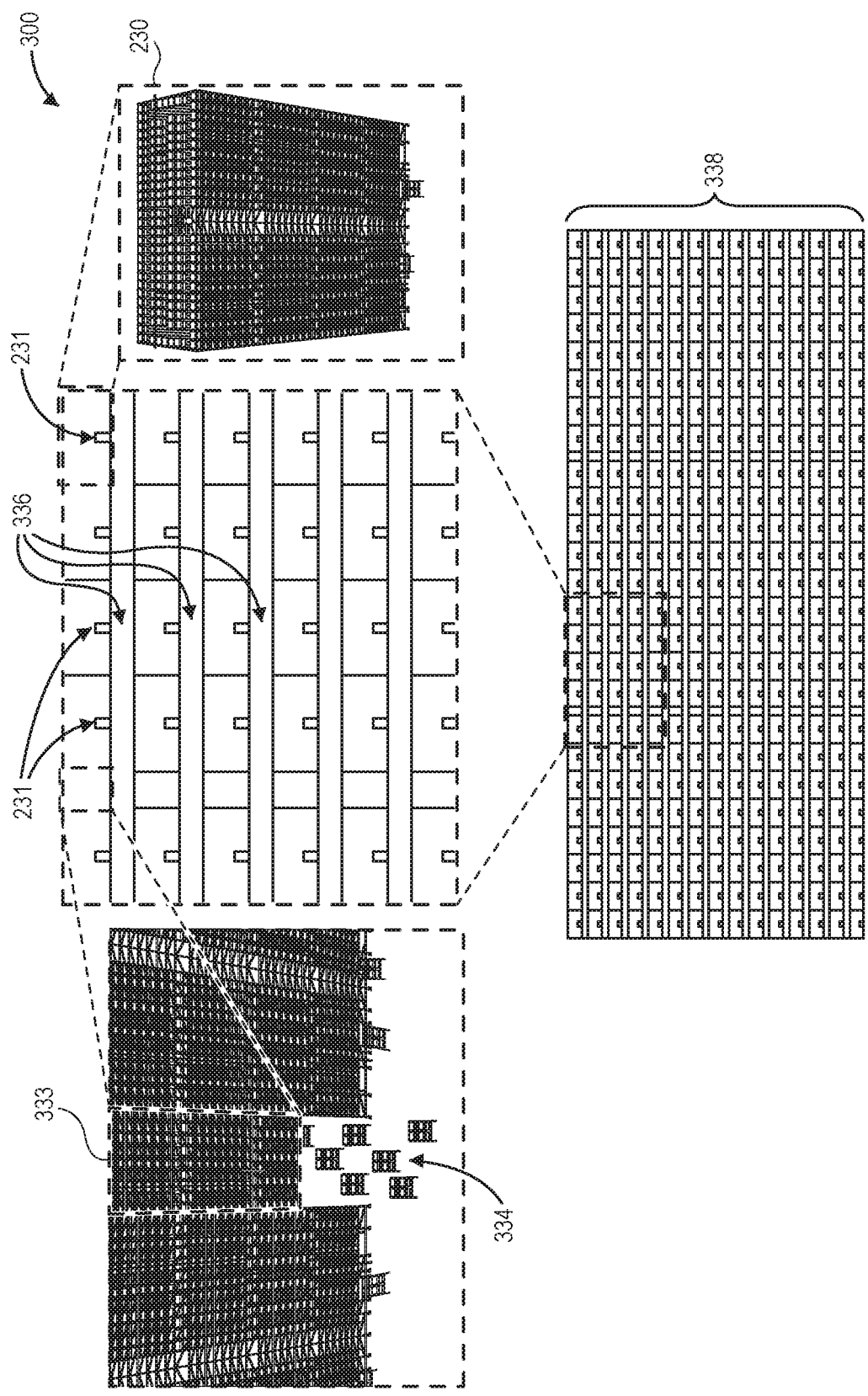
FIG. 3 is a schematic, overhead view diagram, and several partial, close-up views, of an example high density, robotic warehouse system, in accordance with implementations of the present disclosure.

FIG. 2 is a schematic, upper perspective view diagram 200, and a partial, close-up view, of an example high density, robotic warehouse system, in accordance with implementations of the present disclosure. FIG. 3 is a schematic, overhead view diagram 300, and several partial, close-up views, of an example high density, robotic warehouse system, in accordance with implementations of the present disclosure. The example high density, robotic warehouse system may be an example of a high density, robotic warehouse system 115 described at least with respect to FIG. 1.

As shown in FIG. 2, an example block 230 of the high density, robotic warehouse system may include a plurality of floors or levels. In one example embodiment, each block 230 may have a footprint of approximately forty feet wide by twenty feet deep, and each block may extend vertically approximately sixty five feet high. In addition, each block 230 may have approximately thirty eight floors or levels. In other example embodiments, each block 230 may have various different dimensions associated with width, depth, height, and/or number of floors. Further, multiple blocks, e.g., two, five, ten, or more blocks, may be positioned side by side or in a grid to increase or modify the available storage within the system, thereby providing modularity and scalability. Moreover, one or more blocks, or portions thereof, may include different temperature zones to enable storage of different types of items, e.g., perishable, frozen, produce, or other types of items.

Each floor or level of the example block 230 may include a plurality of storage grid locations, and each storage grid location may be sized or configured to receive a respective tote. In addition, the plurality of storage grid locations may be connected via a plurality of highway grids that enable movement of robotic drive units, e.g., mouse drive units, and totes between various portions of the block 230. Further, each floor or level of the example block 230 may be connected to other floors or levels via one or more elevators 231. For example, the elevators 231 may comprise flat plates, decks, or surfaces that may be moved vertically between floors using various types of actuators, e.g., chain drives, pulley drives, screw drives, geared mechanisms, linear actuators, or other actuators or mechanisms.

In an example embodiment, the lowest floor of each block 230 may include approximately fifty two storage grid locations connected by highway grids, such that the lowest floor may receive and store approximately fifty two totes. In addition, each upper floor, e.g., the upper thirty seven floors, of each block 230 may include approximately one hundred fifty three to one hundred seventy four storage grid locations connected by highway grids, such that each upper floor may receive and store approximately one hundred fifty three to one hundred seventy four totes. As a result, an example block 230 having thirty eight floors may include approximately six thousand six hundred storage grid locations that may receive and store approximately six thousand six hundred totes. In other example embodiments, each block 230 may have various other numbers, configurations, or arrangements of storage grid locations, totes, elevators, and highway grids.

In addition, the example block 230 may include one or more docks 232, e.g., four docks on one side and four to five docks on an opposite side, associated with the lowest floor of the high density, robotic warehouse system, e.g., positioned along an edge or side, or at least partially around a periphery of the system. For example, each dock 232 may enable transfer of totes carried by barges and barge drive units between the block 230 and various upstream and/or downstream processes or operations. Example processes or operations may include receiving or stowing items to totes, loading totes to barges, picking or removing items from totes, unloading totes from barges, and/or various other processes or operations. In other example embodiments, each block 230 may have various other numbers, configurations, or arrangements of docks 232.

As shown in FIG. 3, multiple blocks 230, e.g., two, five, ten, or more blocks, may be positioned side by side in a row of connected blocks to increase or modify the available storage within the system, thereby providing modularity and scalability. In addition, in order to provide access or pathways 334 to opposite sides of a row of connected blocks, one or more elevated blocks 333 may be positioned between adjacent blocks 230 of the row of connected blocks. An elevated block 333 may provide clearance from the ground to enable barge drive units, barges, and totes carried thereon to pass under the elevated block 333, and the elevated block 333 may be connected to adjacent blocks 230 of the row of connected blocks on either side of the elevated block 333.

Further, multiple rows of connected blocks, e.g., two, five, ten, or more rows of connected blocks, and potentially including interconnected elevated blocks 333, may be positioned adjacent each other to form an example high density, robotic warehouse system 338 and further increase or modify the available storage within the system, thereby providing modularity and scalability.

An example elevated block 333 of the high density, robotic warehouse system may include a plurality of floors or levels. In one example embodiment, each elevated block 333 may have a footprint of approximately sixteen feet wide by twenty feet deep, and each block may extend vertically approximately sixty five feet high. In addition, each elevated block 333 may have approximately thirty floors or levels. In other example embodiments, each elevated block 333 may have various different dimensions associated with width, depth, height, and/or number of floors. Further, one or more elevated blocks, or portions thereof, may include different temperature zones to enable storage of different types of items, e.g., perishable, frozen, produce, or other types of items.

Each floor or level of an elevated block 333 may include a plurality of storage grid locations, and each storage grid location may be sized or configured to receive a respective tote. In addition, the plurality of storage grid locations may be connected via a plurality of highway grids that enable movement of robotic drive units, e.g., mouse drive units, and totes between various portions of the elevated block 333. In an example embodiment, each floor of an elevated block 333 may include approximately sixty six storage grid locations connected by highway grids, such that each floor may receive and store approximately sixty six totes. As a result, an example elevated block 333 having thirty floors may include approximately two thousand storage grid locations that may receive and store approximately two thousand totes. In other example embodiments, each elevated block 333 may have various other numbers, configurations, or arrangements of storage grid locations, totes, and highway grids.

As shown in FIG. 3, the example high density, robotic warehouse system 338 may have a footprint of approximately one thousand forty two feet wide by four hundred seventeen feet deep, and may extend vertically approximately sixty five feet high. In other example embodiments, the example high density, robotic warehouse system 338 may have various different dimensions associated with width, depth, height, and/or number of blocks, elevated blocks, rows, and/or floors. Further, various portions of the example high density, robotic warehouse system 338 may include different temperature zones to enable storage of different types of items, e.g., perishable, frozen, produce, or other types of items.

In addition, the example high density, robotic warehouse system 338 may include approximately three hundred sixty nine blocks 230 and approximately thirty elevated blocks 333 that are arranged in several rows of connected blocks. As a result, the example high density, robotic warehouse system 338 may include approximately two million five hundred thousand storage grid locations that may receive and store approximately two million five hundred thousand totes. In other example embodiments, the example high density, robotic warehouse system 338 may have various other numbers, configurations, or arrangements of storage grid locations, totes, and highway grids.

Moreover, an example high density, robotic warehouse system 338 including multiple rows of connected blocks may also include one or more service access zones or areas 336 between adjacent rows. For example, the service access zones 336 may include stairways, ladders, catwalks, or other regions or areas that may enable access by humans and/or machines. The service access zones 336 may be adjacent to various portions of the example system 338, and/or the service access zones 336 may be positioned at least partially within various portions of the example system 338. In some example embodiments, the service access zones 336 may enable access by humans using various machines, e.g., bucket cranes, cherry pickers, or other mobile, vertical lift mechanisms. In this manner, substantially all portions of an example system 338 may be accessible for service while maintaining operation of the example high density, robotic warehouse system 338. In other example embodiments, a high density, robotic warehouse system may have various other numbers, configurations, or arrangements of service access zones 336.

Furthermore, in some example embodiments, robotic drive units, e.g., mouse drive units, operating within an example high density, robotic warehouse system 338 may be able to traverse between blocks and/or elevated blocks that form a single row of connected blocks situated between two service access zones 336 as shown in FIG. 3. In such example embodiments, robotic drive units, e.g., mouse drive units, operating within the example high density, robotic warehouse system 338 may not be able to traverse between different rows of connected blocks that are separated by a service access zone 336. In alternative example embodiments, one or more bridges, catwalks, skyways, or other elevated pathways may extend between different rows of connected blocks and across one or more service access zones 336; in such examples, robotic drive units, e.g., mouse drive units, operating within the example high density, robotic warehouse system 338 may be able to traverse between different rows of connected blocks that are separated by a service access zone 336 via the one or more bridges, catwalks, skyways, or other elevated pathways that extend between different rows of connected blocks.

The example high density, robotic warehouse system may be sized or scaled to fit and operate within any available space of within an environment, such as a warehouse, storage facility, material handling facility, or any other building or facility. In addition, the size or scale of the high density, robotic warehouse system may be adjusted or modified over time as needed, e.g., based on available space, supply, demand, throughput, or other factors. Further, as described herein, the high density, robotic warehouse system may be implemented to support and improve existing item or product paths, e.g., item receive and stow, item storage, item sortation, item retrieval, item consolidation, item packing and shipping, and others. Various other item or product paths may also be supported by the high density, robotic warehouse system described herein.

Figure 4:
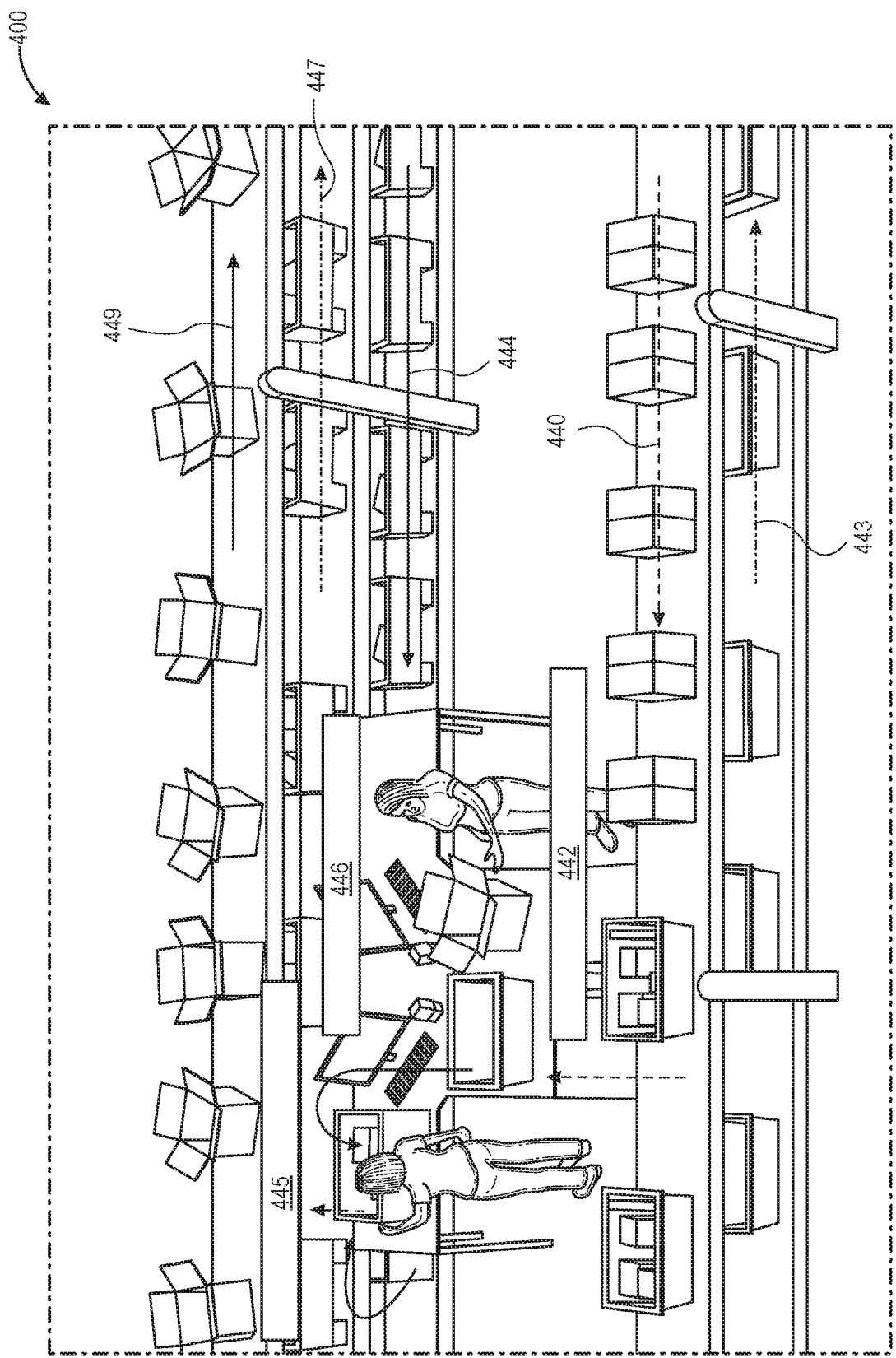
FIG. 4 is a schematic, perspective view diagram of an example item decant station utilized with an example high density, robotic warehouse system, in accordance with implementations of the present disclosure.

FIG. 4 is a schematic, perspective view diagram 400 of an example item decant station utilized with an example high density, robotic warehouse system, in accordance with implementations of the present disclosure. The item decant station may be an example of an item decant station 105 described at least with respect to FIG. 1.

As shown in FIG. 4, a plurality of items 440 may arrive to an item decant station as cases, boxes, containers, totes, or other groups of items using various material handling and/or conveyance equipment. At an item decant station, a tote or case 442 may be picked from among the arriving cases, boxes, containers, totes, or other groups of items to decant one or more items contained therein using manual, robotic, automated, or semi-automated processes.

In addition, empty or depleted totes 444 that may be utilized within the high density, robotic warehouse system may arrive to the item decant station using various material handling and/or conveyance equipment. At the item decant station, an empty or depleted tote 445 may also be picked from among the arriving empty or depleted totes into which to decant one or more items using manual, robotic, automated, or semi-automated processes.

Then, one or more items contained in the picked tote or case 442 may be decanted into the empty or depleted tote 445 using manual, robotic, automated, or semi-automated processes to form a decanted tote 446. After completion of the decanting operation, the now-empty tote or case 443 from which the one or more items have been decanted may be transferred to an item processing station using various material handling and/or conveyance equipment. Further, the full tote 447 that may be utilized within the high density, robotic warehouse system and into which the one or more items have been decanted may be transferred to a barge loading/unloading station using various material handling and/or conveyance equipment. Moreover, empty boxes, containers, or other recyclable, reusable, or disposable materials 449 may be transferred to recycling or disposal stations using various material handling and/or conveyance equipment.

Although FIG. 4 illustrates a particular configuration and arrangement of an example item decant station, in other example embodiments, an item decant station may have various other configurations or arrangements, e.g., related to number or type of operators, associates, machines, equipment, or conveyance equipment, inbound materials, items, or totes, and/or outbound materials, items, or totes. Further, various operational parameters associated with an item decant station, e.g., number of associates or machines, number of operational stations, number or speed of inbound and/or outbound materials, items, or totes, etc., may be modified or adjusted to affect aspects such as throughput, efficiency, load balancing, or other characteristics of the item decant station.

Figure 5:
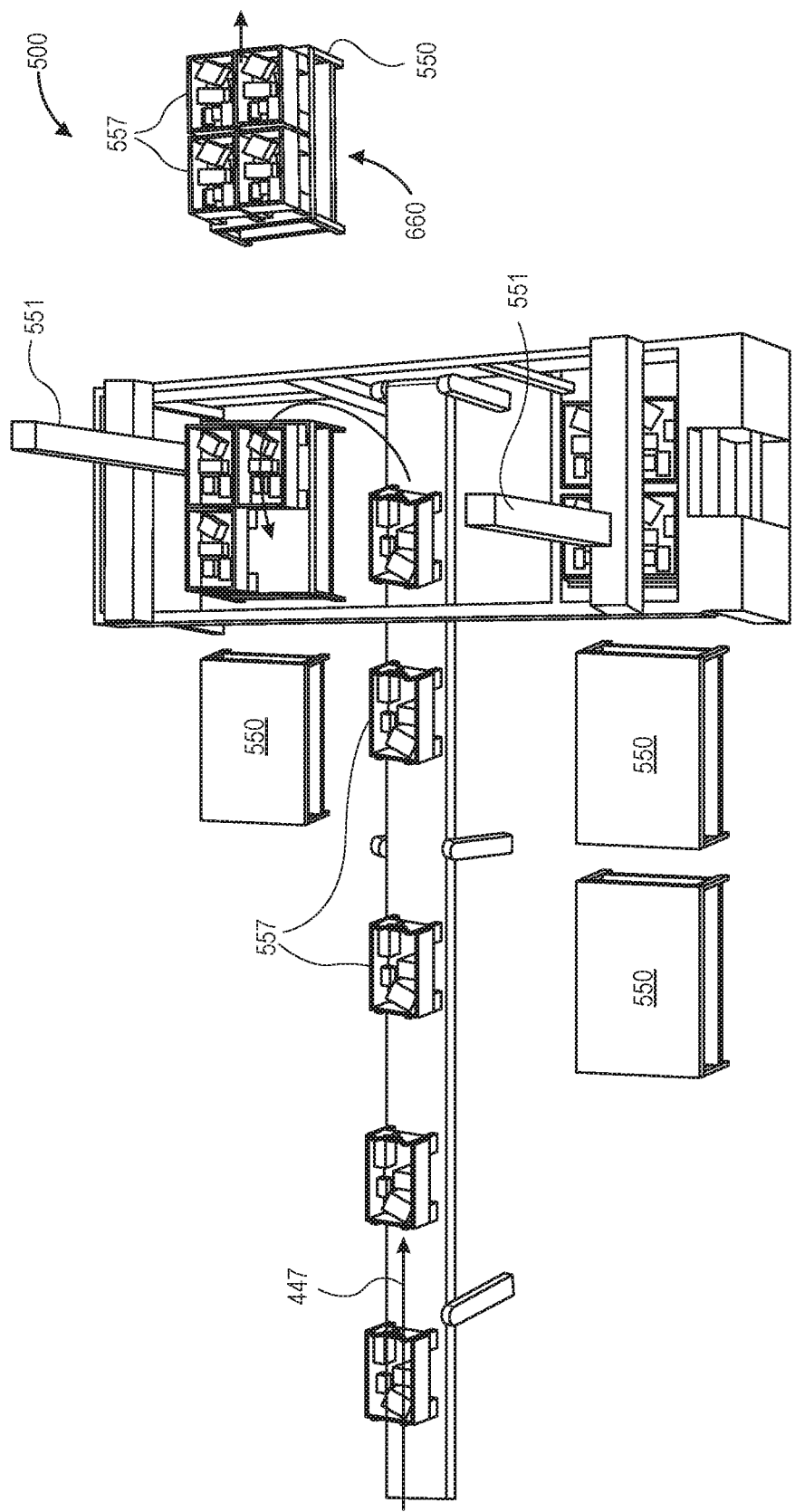
FIG. 5 is a schematic, perspective view diagram of an example barge loading station utilized with an example high density, robotic warehouse system, in accordance with implementations of the present disclosure.

FIG. 5 is a schematic, perspective view diagram 500 of an example barge loading station utilized with an example high density, robotic warehouse system, in accordance with implementations of the present disclosure. The barge loading station may be an example of a barge loading/unloading station 110 described at least with respect to FIG. 1.

As shown in FIG. 5, a plurality of full totes 447 into which one or more items have been decanted, e.g., at an item decant station, may arrive at a barge loading/unloading station. The barge loading/unloading station may include one or more robotic or automated machines, equipment, or apparatus 551 configured to load individual totes 557 onto barges 550. In example embodiments, the robotic or automated machines may comprise robotic arms, grasping arms, gantry systems, or other robotic or automated movement systems having associated end effectors configured to grasp, lift, move, and place individual totes 557 onto barges 550. In other example embodiments, one or more human associates may load totes 557 onto barges 550 using substantially manual processes or with the assistance of machines, equipment, or apparatus such as forklifts, pallet jacks, or others.

Figure 6:
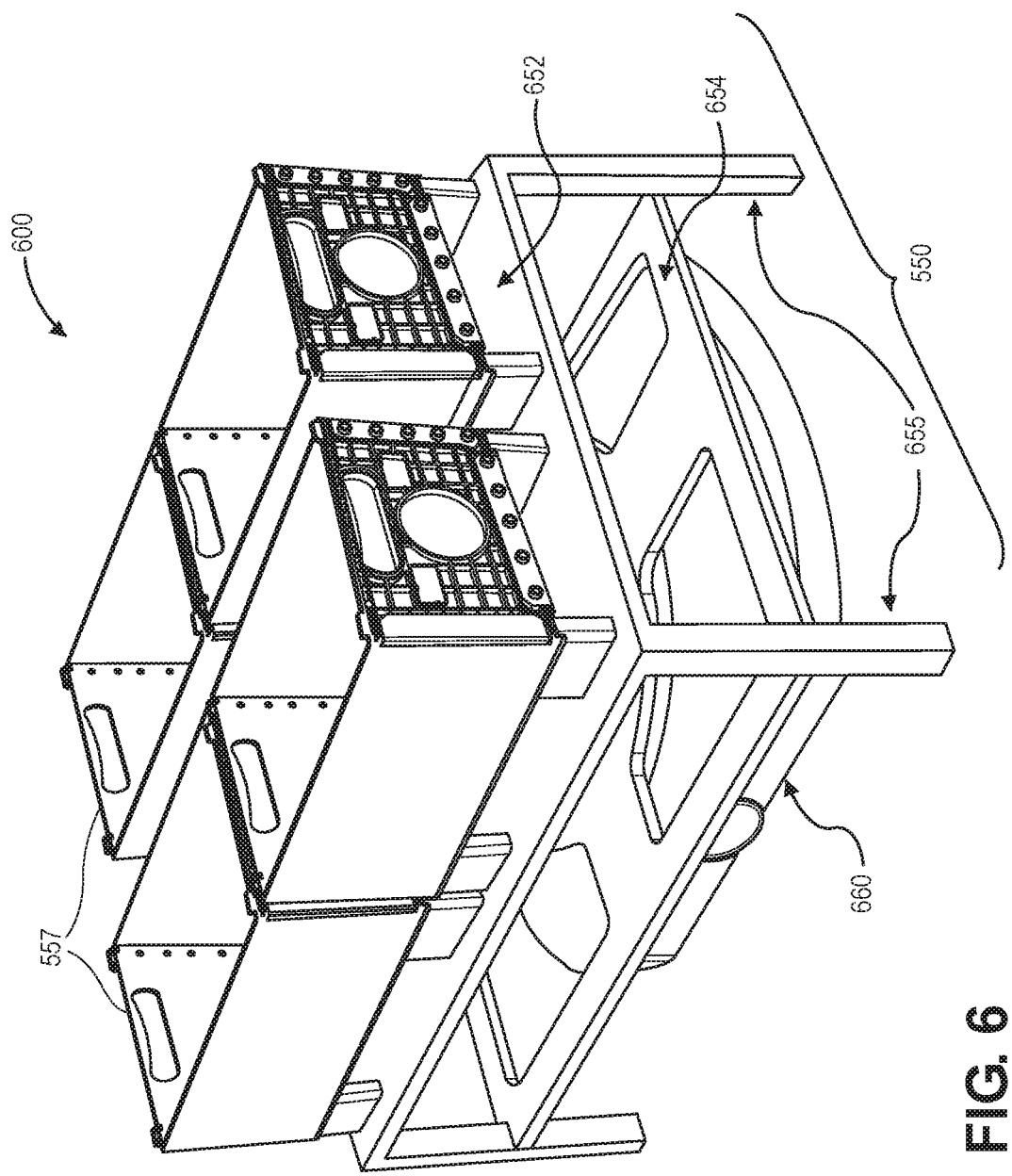
FIG. 6 is a schematic, perspective view diagram of an example barge, barge drive unit, and totes utilized with an example high density, robotic warehouse system, in accordance with implementations of the present disclosure.
Figure 7:
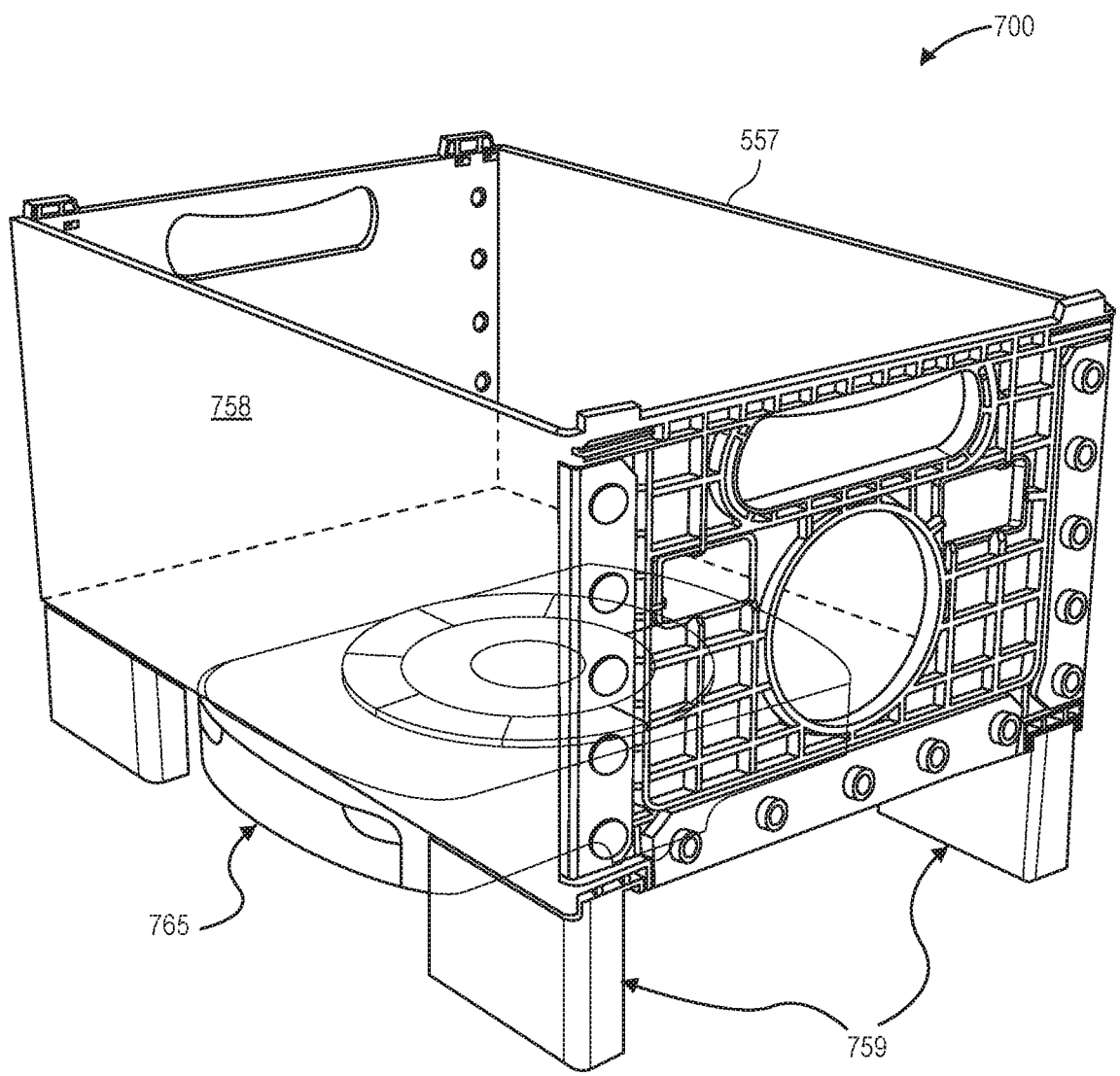
FIG. 7 is a schematic, perspective view diagram of an example mouse drive unit and tote utilized with an example high density, robotic warehouse system, in accordance with implementations of the present disclosure.

Barges 550, which are described in more detail at least with respect to FIG. 6, may be configured to receive a plurality of totes 557, e.g., four totes, which are also described in more detail at least with respect to FIGS. 6 and 7. In addition, one or more barge drive units 660, which are also described in more detail at least with respect to FIG. 6, may be configured to be lift, move, and place barges 550.

Thus, as shown in FIG. 5, a barge drive unit 660 may lift and move a barge 550 to the barge loading/unloading station. The barge drive unit 660 may hold or place the barge 550 proximate the robotic or automated machine 551, such that the robotic or automated machine 551 can load one or more totes 557 onto the barge 550. When the loading of totes 557 is complete, the barge drive unit 660 may again lift and/or move the barge 550 to downstream processes or operations.

Although FIG. 5 illustrates a particular configuration and arrangement of an example barge loading/unloading station, in other example embodiments, a barge loading/unloading station may have various other configurations or arrangements, e.g., related to number or type of operators, associates, machines, equipment, or conveyance equipment, inbound materials, items, or totes, and/or outbound materials, items, or totes. Further, various operational parameters associated with a barge loading/unloading station, e.g., number of associates or machines, number of operational stations, number or speed of inbound and/or outbound materials, items, or totes, etc., may be modified or adjusted to affect aspects such as throughput, efficiency, load balancing, or other characteristics of the barge loading/unloading station.

FIG. 6 is a schematic, perspective view diagram 600 of an example barge, barge drive unit, and totes utilized with an example high density, robotic warehouse system, in accordance with implementations of the present disclosure.

As shown in FIG. 6, an example barge or platform 550 may include an upper surface 652, a base 654, and a plurality of legs 655, e.g., four legs. The barge 550 may have a substantially rectangular prism shape, and spacing between adjacent legs 655 may be sufficient to enable movement of a barge drive unit 660 under the barge 550.

The upper surface 652 of the barge 550 may be a substantially flat surface that is configured to receive a plurality of totes 557, e.g., four totes. In some example embodiments, the upper surface 652 may include one or more indentations, grooves, slots, lips, flanges, or other surface formations to receive legs of the one or more totes 557 in order to prevent movement of the one or more totes 557, e.g., during transport. The upper surface 652 may also include a lip or flange around the perimeter of the barge 550 in order to prevent the one or more totes 557 from sliding off the upper surface 652.

In addition, the base 654 may also be a substantially flat surface and may include cutouts to reduce overall weight of the barge 550. Further, an underside of the base 654 may be configured to be engaged by a barge lift mechanism of a barge drive unit 660 to lift, move, and place the barge 550.

In an example embodiment, the barge 550 may have a footprint of approximately thirty six inches wide by fifty two inches long, and the barge 550 may stand vertically approximately twenty one inches high. In other example embodiments, the barge 550 may have various different dimensions associated with width, length, and/or height. Further, the barge 550 may be formed from various materials, such as metals, plastics, composites, other materials, or combinations thereof.

An example barge drive unit 660, e.g., a robotic drive unit, may include a barge lift mechanism and a controller (such as the control system described with respect to FIG. 15), that may include a processor, a drive mechanism controller, a power supply, a memory, a barge lift mechanism controller, and a network interface or communication device. In example embodiments, the barge lift mechanism may comprise screw drives, geared mechanisms, linear actuators, or other actuators or mechanisms configured to cause vertical movement of a portion of the barge drive unit 660 and to engage and lift a barge 550.

In example embodiments, the barge drive unit 660 may releasably engage or couple to respective barges 550, such that the barge drive unit 660 may perform various tasks, such as coupling to, lifting, moving, lowering, placing, and uncoupling from respective barges 550 as desired. For example, in order to engage and move a respective barge 550, a barge drive unit 660 may position itself underneath the barge 550. Then, the barge lift mechanism may move vertically to engage with an underside of a base of a barge 550 and lift the barge 550. While the barge 550 is lifted via the barge lift mechanism, the barge drive unit 660 may move or transfer the barge 550 between portions of the high density, robotic warehouse system and portions of the environment. Upon reaching a destination location for the barge 550, the barge lift mechanism may again move vertically to disengage with the underside of the base of the barge 550 and lower the barge 550.

In addition, the barge drive unit 660 may be in communication with a control system (such as the control system described with respect to FIG. 16), that may be configured to send and/or receive commands, instructions, and/or data to control and coordinate operations of the barge drive unit 660, as well as other portions of the high density, robotic warehouse system, such as movements to and from barge loading/unloading stations, movements to and from item processing stations, movements to and from docks associated with the high density, robotic warehouse system, and/or various other movements. Further, the barge drive unit 660 may move relative to various locations within the environment based in part on fiducial markers, e.g., barcodes, QR (quick response) codes, characters, symbols, radiofrequency (RFID) tags, or other identifiers, on the floors, docks, regions adjacent to barge loading/unloading stations, and/or regions adjacent to processing stations that are detected by one or more sensors of the barge drive unit 660. Example sensors configured to detect fiducial markers may comprise imaging sensors, infrared sensors, RFID readers, or other types of sensors.

In other example embodiments, one or more imaging sensors may also be associated with various positions or locations within the environment, such that imaging data captured by such imaging sensors may be processed to detect various robotic drive units and their respective locations, with or without reference to fiducial markers or identifiers associated with particular locations. In additional example embodiments, one or more laser sensors, photo-eyes, proximity sensors, radio transmitters and/or receivers, radio beacons, or other types of presence detection sensors may be associated with various positions or locations within the environment, such that presence detection data captured by such sensors may be processed to detect various robotic drive units at particular locations, with or without reference to fiducial markers or identifiers associated with particular locations. In further example embodiments, robotic drive units may include motor or wheel encoders associated with drive mechanisms that are configured to measure or detect rotations of motors and/or wheels, in order to determine movements and locations of robotic drive units based on dead reckoning by processing rotation data measured by such encoders. In still further example embodiments, one or more RFID tags may be associated with particular locations within the environment, and RFID readers associated with robotic drive units may detect RFID tags to determine respective locations of robotic drive units, and/or conversely, one or more RFID tags may be associated with particular robotic drive units, and RFID readers associated with various locations within the environment may detect RFID tags to determine respective locations of robotic drive units. Various other types of sensors, as well as combinations of two or more different types of sensors, may be used to measure, detect, and determine movements and locations of robotic drive units within the environment, in order to control and coordinate, e.g., by a controller, operations of robotic drive units within the environment and with respect to the high density, robotic warehouse system.

In other example embodiments, the barge drive unit 660 may have various other shapes, sizes, configurations, or arrangements. For example, in some example embodiments, the barge lift mechanism may include a self-centering configuration or mechanism, such that any barge that is lifted by the barge lift mechanism may be automatically centered with respect to the barge drive unit 660. Various other types of barge lift mechanisms may also be included in the barge drive unit 660 described herein.

FIG. 7 is a schematic, perspective view diagram 700 of an example mouse drive unit and tote utilized with an example high density, robotic warehouse system, in accordance with implementations of the present disclosure.

As shown in FIG. 7, an example tote 557 may comprise a plurality of walls 758, including a base, that form a container or enclosure that may receive, contain, or carry one or more items or products. In an example embodiment, the walls 758 of the tote 557 may have a footprint of approximately sixteen inches wide by twenty four inches deep, and the walls 758 may extend vertically approximately fourteen and a half inches high. One or more walls 758 may also include holes or slots to facilitate grasping, lifting, and movement of the tote, e.g., by human associates. In some example embodiments, one or more partitions may be added or included within the walls 758 to create individual compartments or zones within the tote 557. In other example embodiments, the walls 758 of the tote 557 may have various different dimensions associated with width, depth, and/or height.

The example tote 557 may also include a plurality of feet 759, e.g., four feet, such that the tote 557 stands via the feet 759 at a defined distance from a surface on which it is placed. In an example embodiment, the feet 759 of the tote 557 may extend vertically approximately five inches, such that a base of the tote 557 is approximately five inches above a surface on which the tote is placed. Further, the feet 759 may be offset inward, e.g., approximately one-half inch, from respective outer surfaces of adjacent walls 758 of the tote 557, such that multiple totes 557 may be stacked on top of each other without interference between the feet 759 of an upper stacked tote and the walls 758 of a lower stacked tote. In other example embodiments, the feet 759 of the tote 557 may have various different dimensions associated with height and/or offset.

In addition, the walls 758 and feet 759 of the tote 557 may be formed from sturdy, lightweight materials, such as plastics, cardboard, fiberboard, composites, metals, other materials, or combinations thereof. For example, the tote 557 may be designed or configured to receive, contain, or carry approximately ten individual items or products. In other example embodiments, the tote 557 may be designed or configured to carry various other amounts of items or products.

Furthermore, an example mouse drive unit 765, e.g., a robotic drive unit, may include a tote lift mechanism and a controller (such as the control system described with respect to FIG. 15), that may include a processor, a drive mechanism controller, a power supply, a memory, a tote lift mechanism controller, and a network interface or communication device. In example embodiments, the tote lift mechanism may comprise screw drives, geared mechanisms, linear actuators, or other actuators or mechanisms configured to cause vertical movement of a portion of the mouse drive unit 765 and to engage and lift a tote 557.

In example embodiments, the mouse drive unit 765 may releasably engage or couple to respective totes 557, such that the mouse drive unit 765 may perform various tasks, such as coupling to, lifting, moving, lowering, placing, and uncoupling from respective totes 557 as desired. For example, in order to engage and move a respective tote 557, a mouse drive unit 765 may position itself underneath the tote 557. Then, the tote lift mechanism may move vertically to engage with an underside of a base of the tote 557 and lift the tote 557. While the tote 557 is lifted via the tote lift mechanism, the mouse drive unit 765 may move or transfer the tote 557 within portions of the high density, robotic warehouse system. Upon reaching a destination location for the tote 557, the tote lift mechanism may again move vertically to disengage with the underside of the base of the tote 557 and lower the tote 557.

In addition, the mouse drive unit 765 may be in communication with a control system (such as the control system described with respect to FIG. 16), that may be configured to send and/or receive commands, instructions, and/or data to control and coordinate operations of the mouse drive unit 765, as well as other portions of the high density, robotic warehouse system, such as movements on and off barges, movements to and from docks, movements between blocks, movements between floors, movements in coordination with elevators, movements to and from storage grid locations, and/or various other movements. Further, the mouse drive unit 765 may move relative to various locations within the high density, robotic warehouse system based in part on fiducial markers, e.g., barcodes, QR codes, characters, symbols, RFID tags, or other identifiers, on the floors, elevators, or upper surfaces of barges that are detected by one or more sensors of the mouse drive unit 765. Example sensors configured to detect fiducial markers may comprise imaging sensors, infrared sensors, RFID readers, or other types of sensors.

In other example embodiments, one or more imaging sensors may also be associated with various positions or locations within the high density, robotic warehouse system, such that imaging data captured by such imaging sensors may be processed to detect various robotic drive units and their respective locations, with or without reference to fiducial markers or identifiers associated with particular locations. In additional example embodiments, one or more laser sensors, photoeyes, proximity sensors, radio transmitters and/or receivers, radio beacons, or other types of presence detection sensors may be associated with various positions or locations within the high density, robotic warehouse system, such that presence detection data captured by such sensors may be processed to detect various robotic drive units at particular locations, with or without reference to fiducial markers or identifiers associated with particular locations. In further example embodiments, robotic drive units may include motor or wheel encoders associated with drive mechanisms that are configured to measure or detect rotations of motors and/or wheels, in order to determine movements and locations of robotic drive units based on dead reckoning by processing rotation data measured by such encoders. In still further example embodiments, one or more RFID tags may be associated with particular locations within the high density, robotic warehouse system, and RFID readers associated with robotic drive units may detect RFID tags to determine respective locations of robotic drive units, and/or conversely, one or more RFID tags may be associated with particular robotic drive units, and RFID readers associated with various locations within the high density, robotic warehouse system may detect RFID tags to determine respective locations of robotic drive units. Various other types of sensors, as well as combinations of two or more different types of sensors, may be used to measure, detect, and determine movements and locations of robotic drive units within the high density, robotic warehouse system, in order to control and coordinate, e.g., by a controller, operations of robotic drive units within the high density, robotic warehouse system.

In other example embodiments, the mouse drive unit 765 may have various other shapes, sizes, configurations, or arrangements. For example, in some example embodiments, the tote lift mechanism may include a self-centering configuration or mechanism, such that any tote that is lifted by the tote lift mechanism may be automatically centered with respect to the mouse drive unit 765. Various other types of tote lift mechanisms may also be included in the mouse drive unit 765 described herein.

Figure 8:
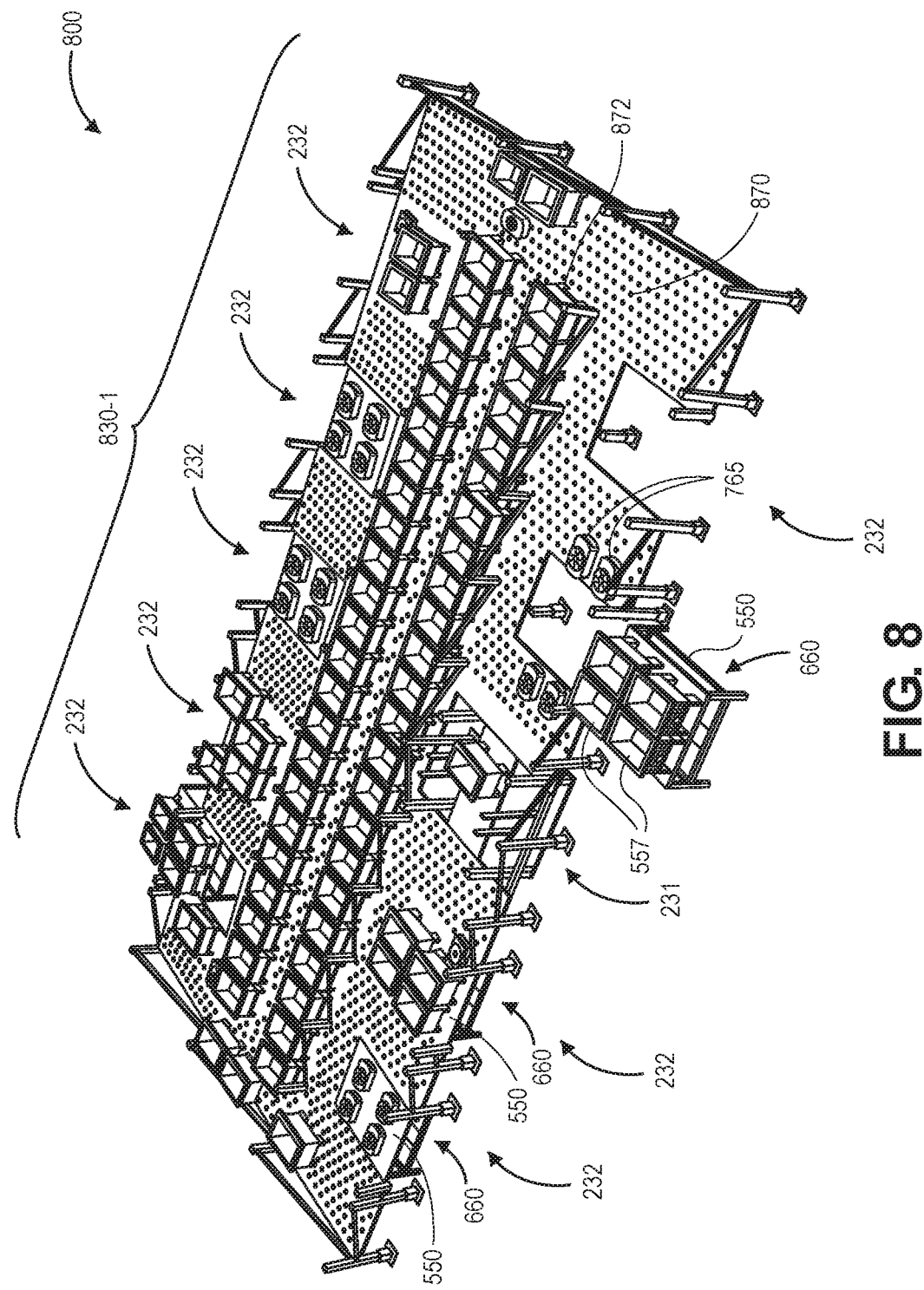
FIG. 8 is a schematic, perspective view diagram of an example lowest floor of an example high density, robotic warehouse system, in accordance with implementations of the present disclosure.

FIG. 8 is a schematic, perspective view diagram 800 of an example lowest floor of an example high density, robotic warehouse system, in accordance with implementations of the present disclosure.

The example lowest floor 830-1 of an example block of a high density, robotic warehouse system may include one or more elevators 231, a plurality of docks 232, e.g., eight or nine docks, a plurality of highway grids 870, and a plurality of storage grid locations 872.

Each dock 232 may be sized or configured to receive a respective barge 550 carried by a barge drive unit 660. In some example embodiments, a barge 550 may be moved to and placed at a dock 232 by a barge drive unit 660, and the barge drive unit 660 may move away to perform other operations. In other example embodiments, a barge 550 may be moved to and placed at a dock 232 by a barge drive unit 660, and the barge drive unit 660 may remain at the dock 232 to lift and move the barge 550 upon completion of processing at the dock 232.

Responsive to placing a barge 550 by a barge drive unit 660 at a dock 232, one or more mouse drive units 765 may move onto and off the upper surface of the barge 550. For example, a mouse drive unit 765 may move onto the upper surface of the barge 550 and lift and move a tote 557 off the upper surface of the barge 550, which may generally comprise a part of a tote or item storage operation. In addition, a mouse drive unit 765 that is carrying a tote 557 may move onto the upper surface of the barge 550 and place a tote 557 onto the upper surface of the barge 550, which may generally comprise a part of a tote or item retrieval operation.

The plurality of highway grids 870 may be sized or configured to enable movement of mouse drive units and/or totes between elevators 231, docks 232, storage grid locations 872, and/or other portions of the block and/or floor. Each storage grid location 872 may be sized or configured to receive a respective tote. Further, the elevators 231 may also be sized or configured to receive mouse drive units and/or totes, and enable movement of the mouse drive units and/or totes between floors of the block. In contrast, the service access zones 336 described at least with respect to FIG. 3 may be restricted zones that do not allow access or movement by robotic drive units and/or totes, and may include physical barriers, walls, rails, or fences to maintain such restrictions.

The one or more elevators 231, the one or more docks 232, the plurality of highway grids 870, the plurality of storage grid locations 872, and/or upper surfaces of barges 550 may include a plurality of fiducial markers, e.g., barcodes, QR codes, characters, symbols, RFID tags, or other identifiers, that are positioned at various locations of the floor, elevators, docks, and/or upper surface of barges, e.g., in one or more grid patterns that substantially match the plurality of storage grid locations 872 and corresponding portions of the plurality of highway grids 870, one or more elevators 231, one or more docks 232, and/or upper surfaces of barges 550. In this manner, mouse drive units may be able to traverse among the one or more elevators 231, the one or more docks 232, the plurality of highway grids 870, the plurality of storage grid locations 872, and/or upper surfaces of barges 550, as well as between floors of the block to move or transfer totes, or perform various other operations, by detecting the plurality of fiducial markers during movement to identify and maintain their respective locations within the block.

Although FIG. 8 illustrates a particular number, configuration, and arrangement of a lowest floor 830-1 having one or more elevators 231, a plurality of docks 232, a plurality of highway grids 870, a plurality of storage grid locations 872, barges 550, barge drive units 660, mouse drive units 765, and associated fiducial markers to facilitate robotic drive unit operations, in other example embodiments, various other numbers, configurations, or arrangements of such components or portions of the lowest floor may be included in an example block of the high density, robotic warehouse system.

Figure 9:
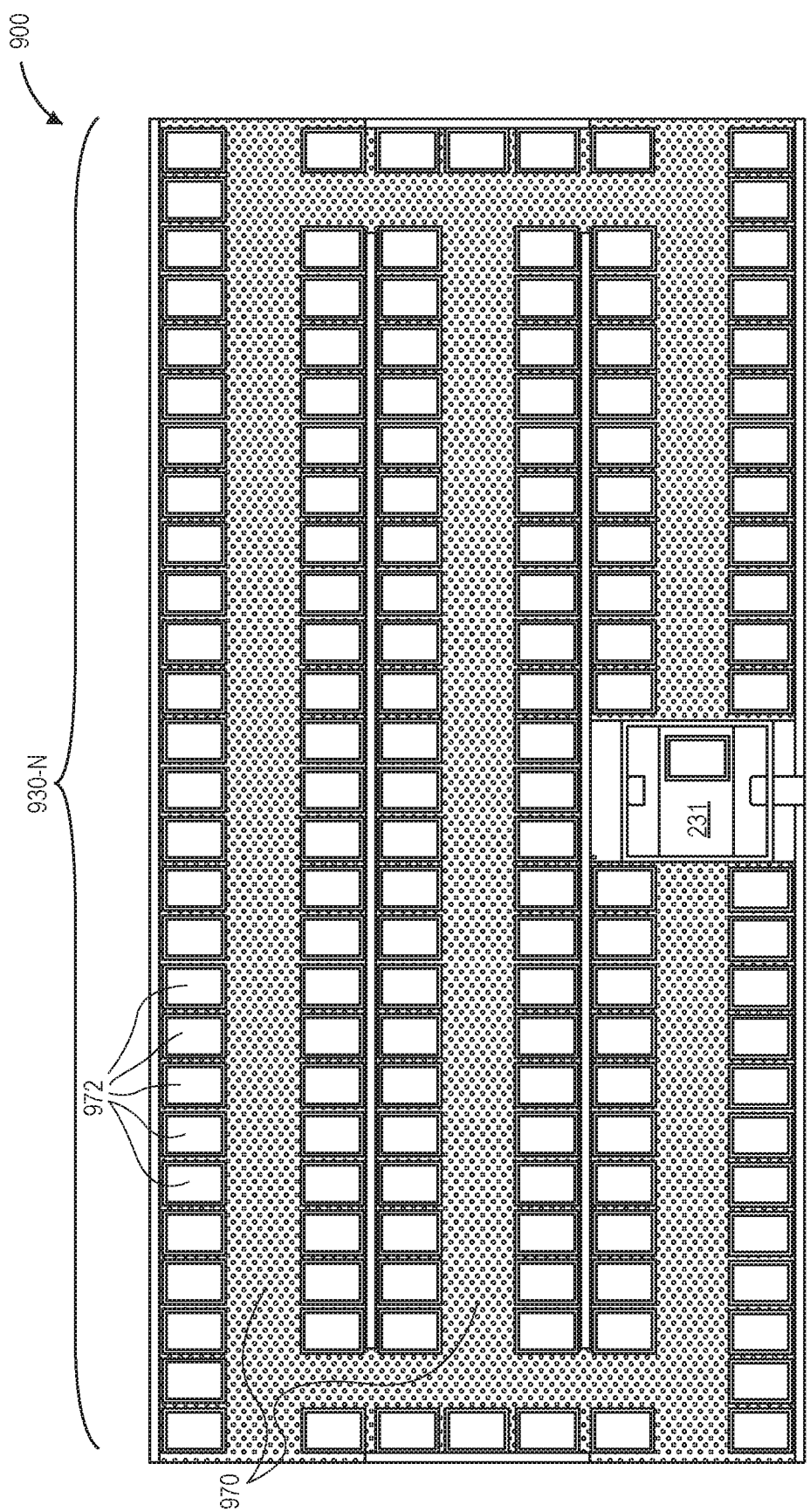
FIG. 9 is a schematic, perspective view diagram of an example upper floor of an example high density, robotic warehouse system, in accordance with implementations of the present disclosure.

FIG. 9 is a schematic, perspective view diagram 900 of an example upper floor of an example high density, robotic warehouse system, in accordance with implementations of the present disclosure.

The example upper floor 930-N of an example block of a high density, robotic warehouse system may include one or more elevators 231, a plurality of highway grids 970, and a plurality of storage grid locations 972.

The plurality of highway grids 970 may be sized or configured to enable movement of mouse drive units and/or totes between elevators 231, storage grid locations 972, and/or other portions of the block and/or floor. Each storage grid location 972 may be sized or configured to receive a respective tote. Further, the elevators 231 may also be sized or configured to receive mouse drive units and/or totes, and enable movement of the mouse drive units and/or totes between floors of the block. In contrast, the service access zones 336 described at least with respect to FIG. 3 may be restricted zones that do not allow access or movement by robotic drive units and/or totes, and may include physical barriers, walls, rails, or fences to maintain such restrictions.

The one or more elevators 231, the plurality of highway grids 970, and the plurality of storage grid locations 972 may include a plurality of fiducial markers, e.g., barcodes, QR codes, characters, symbols, RFID tags, or other identifiers, that are positioned at various locations of the floor and/or elevators, e.g., in one or more grid patterns that substantially match the plurality of storage grid locations 972 and corresponding portions of the plurality of highway grids 970 and one or more elevators 231. In this manner, mouse drive units may be able to traverse among the one or more elevators 231, the plurality of highway grids 970, and the plurality of storage grid locations 972, as well as between floors of the block to move or transfer totes, or perform various other operations, by detecting the plurality of fiducial markers during movement to identify and maintain their respective locations within the block.

Although FIG. 9 illustrates a particular number, configuration, and arrangement of an upper floor 930-N having one or more elevators 231, a plurality of highway grids 970, a plurality of storage grid locations 972, and associated fiducial markers to facilitate robotic drive unit operations, in other example embodiments, various other numbers, configurations, or arrangements of such components or portions of the upper floor may be included in an example block of the high density, robotic warehouse system.

Furthermore, each floor of an elevated block 333 described at least with respect to FIG. 3 of an example high density, robotic warehouse system may also include a plurality of highway grids and a plurality of storage grid locations, which may be configured or arranged in a manner similar to the example upper floor 930-N shown in FIG. 9, with the possible exception of the one or more elevators 231.

Figure 10:
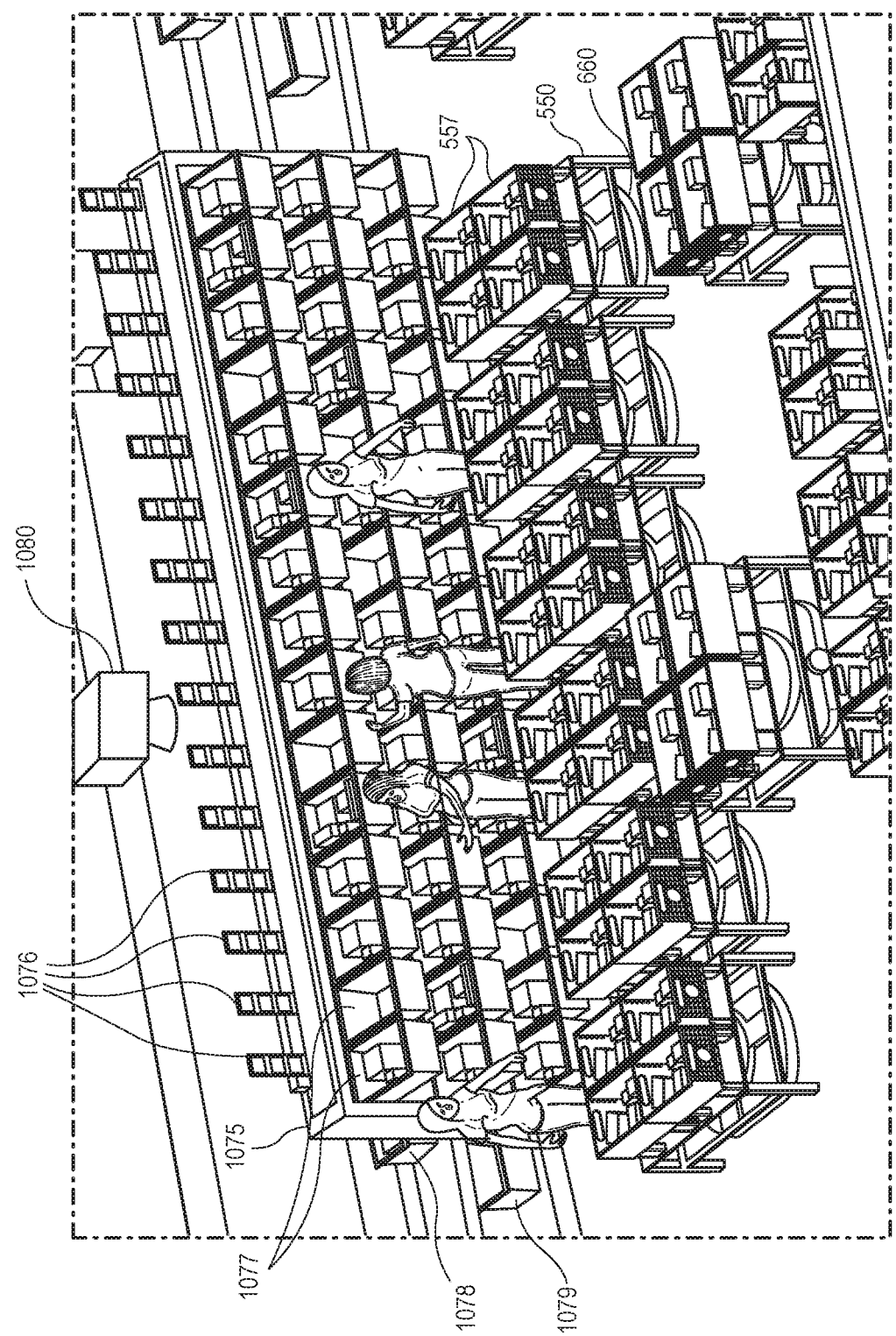
FIG. 10 is a schematic, perspective view diagram of an example item processing station utilized with an example high density, robotic warehouse system, in accordance with implementations of the present disclosure.

FIG. 10 is a schematic, perspective view diagram 1000 of an example item processing station utilized with an example high density, robotic warehouse system, in accordance with implementations of the present disclosure. The item processing station may be an example of an item processing station 118 described at least with respect to FIG. 1.

As shown in FIG. 10, one or more barges 550 loaded with totes 557 may be transported by one or more barge drive units 660 from the high density, robotic warehouse system to an item processing station. As described herein, one or more mouse drive units within the high density, robotic warehouse system may have previously loaded individual totes 557 onto the barges 550 at one or more docks of the high density, robotic warehouse system, and the barge drive units 660 may engage and move the barges 550 to the item processing station.

The item processing station may be configured to receive one or more barges 550 loaded with totes, such that items contained within the totes may be processed for further downstream operations or processes. In an example embodiment, the item processing station may include a sortation or rebin wall 1075 having a plurality of totes 1077, e.g., transship totes or order totes, to be filled with one or more items from the totes 557 loaded onto the barges 550. The picking of items from the totes 557 and placement of items into the totes 1077 may be performed using manual, robotic, automated, or semi-automated processes. Individual ones of the totes 1077 may be associated with transship orders, customer orders, or other groups of orders, shipments, or deliveries.

In addition, a plurality of visual indicators 1076 may be associated with the sortation wall 1075 to indicate a respective status of each tote 1077. For example, the visual indicators 1076 may indicate into which tote 1077 an item is to be placed, may indicate an error with a tote 1077, may indicate completion of filling of a tote 1077, and/or may provide various other indications or notifications. Further, other types of indications or notifications may also be included in the item processing station, such as screens, monitors, displays, audio indicators, haptic indicators, or others.

Upon completion of filling of a tote 1077 of the sortation wall 1075, the completed tote 1078 may be transferred to a downstream station or process, e.g., a palletizing/depalletizing station 103 or a pack station 122 as described with respect to FIG. 1, using various material handling and/or conveyance equipment. In addition, empty or depleted totes 1079 may be received from other processes or operations, e.g., from an item decant station 105 and/or a pack station 122 as described with respect to FIG. 1, using various material handling and/or conveyance equipment, and the empty or depleted totes 1079 may be placed in vacant positions of the sortation wall 1075 to continue item processing operations with respect to items contained in the totes 557 loaded onto the barges 550.

Upon completion of processing of items contained in totes 557 loaded onto barges 550, the barges 550 may be moved by barge drive units 660 to either a barge loading/unloading station or one or more docks associated with the high density, robotic warehouse system. For example, if one or more totes 557 carried by the barges 550 and barge drive units 660 are depleted or empty and/or need replenishment or consolidation, the barges 550 with the empty totes 557 may be transported by barge drive units 660 to a barge loading/unloading station as further described herein. In addition, if one or more totes 557 carried by the barges 550 and barge drive units 660 are still substantially full and/or do not need replenishment or consolidation, the barges 550 with the full totes 557 may be transported by barge drive units 660 back to one or more docks of the high density, robotic warehouse system, such that one or more mouse drive units may engage and move the totes 557 back into the high density, robotic warehouse system for storage until later retrieval is again requested. Various combinations of these operations are also possible, e.g., if a barge 550 carries one or more totes 557 that are empty or need replenishment as well as one or more totes 557 that are full or do not need replenishment.

In some example embodiments, the determination of whether a barge should be moved by a barge drive unit to a barge loading/unloading station or to a dock of the high density, robotic warehouse system may be made based on data stored in association with the barges, totes, and items contained therein, as well as data associated with various operations instructed and performed at the item processing station. For example, based on an instruction to perform, and a subsequent confirmation of successful performance of, a pick operation of a particular item from a particular tote, a control system may automatically update data stored in association with the barge and tote to remove the particular item from the particular tote. Then, based on updated data stored in the association with the barges, totes, and items contained therein after performing all instructed operations at the item processing station, a control system may determine whether a barge should be moved by a barge drive unit to a barge loading/unloading station, e.g., if one or more totes are depleted or in need of replenishment or consolidation, or to a dock of the high density, robotic warehouse system, e.g., if one or more totes are still full or do not need replenishment or consolidation.

In additional example embodiments, feedback or data may be provided by portions of the item processing station in order to aid the determination of whether a barge should be moved by a barge drive unit to a barge loading/unloading station or to a dock of the high density, robotic warehouse system. For example, one or more sensors 180, such as cameras, imaging sensors, scanning devices, RFID readers, or other types of sensors, may be positioned overhead or in proximity to one or more totes 557 transported by barges and barge drive units to the item processing station. Based on processing and analysis of data from the one or more sensors 180, a control system may automatically update data stored in association with barges, totes, and items contained therein based on various operations instructed and performed at the item processing station. Moreover, operator or associate input or feedback, such as confirmation of performance of picking tasks, scanning of items using handheld scanners, imaging devices, computing devices, or other devices, inputs related to counting of items in totes, and/or various other associate operations, may also be used by a control system to update data stored in association with barges, totes, and items contained therein. Then, based on updated data stored in association with the barges, totes, and items contained therein after performing all instructed operations at the item processing station, a control system may determine whether a barge should be moved by a barge drive unit to a barge loading/unloading station, e.g., if one or more totes are depleted or in need of replenishment or consolidation, or to a dock of the high density, robotic warehouse system, e.g., if one or more totes are still full or do not need replenishment or consolidation.

Although FIG. 10 illustrates a particular configuration and arrangement of an example item processing station, in other example embodiments, an item processing station may have various other configurations or arrangements, e.g., related to number or type of operators, associates, machines, equipment, or conveyance equipment, inbound materials, items, or totes, and/or outbound materials, items, or totes. Further, various operational parameters associated with an item processing station, e.g., number of associates or machines, number of operational stations, number or speed of inbound and/or outbound materials, items, or totes, etc., may be modified or adjusted to affect aspects such as throughput, efficiency, load balancing, or other characteristics of the item processing station.

Figure 11:
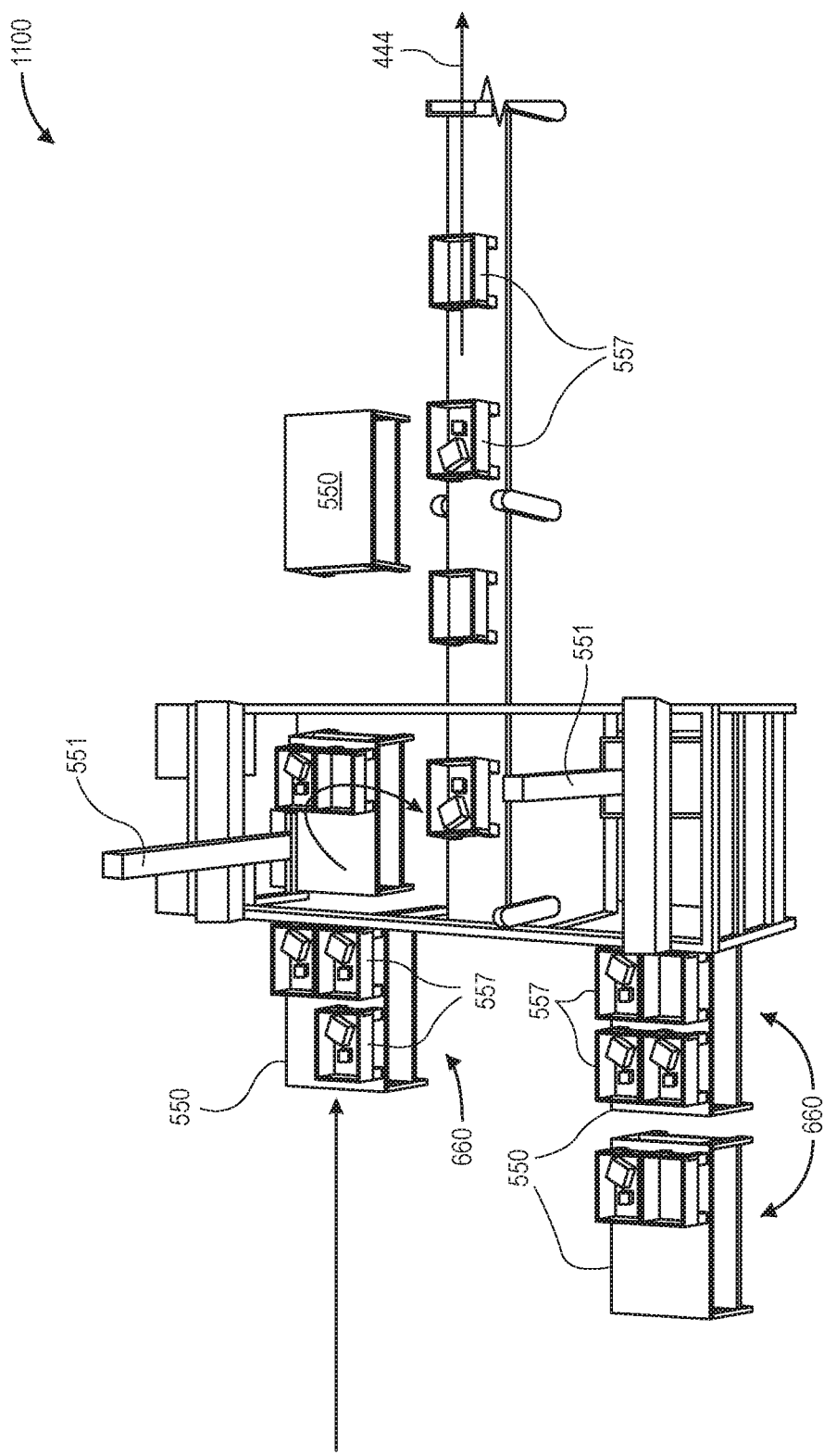
FIG. 11 is a schematic, perspective view diagram of an example barge unloading station utilized with an example high density, robotic warehouse system, in accordance with implementations of the present disclosure.

FIG. 11 is a schematic, perspective view diagram 1100 of an example barge unloading station utilized with an example high density, robotic warehouse system, in accordance with implementations of the present disclosure. The barge unloading station may be an example of a barge loading/unloading station 110 described at least with respect to FIG. 1, and may be substantially similar or the same as the barge loading station described at least with respect to FIG. 5.

As shown in FIG. 11, a plurality of totes from which one or more items have been picked, e.g., at an item processing station, may be transported by barges 550 and barge drive units 660 to a barge loading/unloading station. The barge loading/unloading station may include one or more robotic or automated machines, equipment, or apparatus 551 configured to unload totes 557 from barges 550. In example embodiments, the robotic or automated machines may comprise robotic arms, grasping arms, gantry systems, or other robotic or automated movement systems having associated end effectors configured to grasp, lift, move, and place individual totes 557 from barges 550. In other example embodiments, one or more human associates may unload totes 557 from barges 550 using substantially manual processes or with the assistance of machines, equipment, or apparatus such as forklifts, pallet jacks, or others.

Thus, as shown in FIG. 11, a barge drive unit 660 may lift and move a barge 550 to the barge loading/unloading station. The barge drive unit 660 may hold or place the barge 550 proximate the robotic or automated machine 551, such that the robotic or automated machine 551 can unload one or more totes 557 from the barge 550. When the unloading of totes 557 is complete, the barge drive unit 660 may again lift and/or move the barge 550 to other processes or operations. In addition, the totes 557 that have been unloaded from the barges 550 may be transferred as empty or depleted totes 444 to various other processes, e.g., an item decant station, using various material handling and/or conveyance equipment.

Although FIG. 11 illustrates a particular configuration and arrangement of an example barge loading/unloading station, in other example embodiments, a barge loading/unloading station may have various other configurations or arrangements, e.g., related to number or type of operators, associates, machines, equipment, or conveyance equipment, inbound materials, items, or totes, and/or outbound materials, items, or totes. Further, various operational parameters associated with a barge loading/unloading station, e.g., number of associates or machines, number of operational stations, number or speed of inbound and/or outbound materials, items, or totes, etc., may be modified or adjusted to affect aspects such as throughput, efficiency, load balancing, or other characteristics of the barge loading/unloading station.

Although barge loading stations and barge unloading stations are described herein individually with respect to FIGS. 5 and 11, in some example embodiments, one or more barge loading/unloading stations may be configured to operate as both barge loading stations and barge unloading stations. For example, at a first time of operation, a barge loading/unloading station may operate as a barge loading station, and at a second later time of operation, the same barge loading/unloading station may instead operate as a barge unloading station, e.g., by substantially changing or inverting the order and/or direction of operations of the barge loading/unloading station. In further example embodiments, a single barge loading/unloading station may be configured to operate as both a barge loading station and a barge unloading station substantially simultaneously or concurrently, e.g., if the station includes multiple conveyance mechanisms that can move in opposite directions as well as multiple barge loading apparatus and barge unloading apparatus that can operate substantially simultaneously or concurrently.

Moreover, a control system (such as the control system described with respect to FIG. 16), may be in communication with each of the robotic drive units, elevators, item decant stations, barge loading/unloading station, and/or item processing stations, and may send and/or receive commands, instructions, and/or data to control or coordinate operations of the various components of the high density, robotic warehouse system. For example, the control system may control, instruct, or coordinate movement of robotic drive units to perform item receive/stow, item pick/place, drive unit load balancing, and/or other processes. In addition, the control system may control, instruct, or coordinate movement of robotic drive units and elevators to facilitate movement of robotic drive units, barges, and totes between stations, blocks, docks, floors, storage grid locations, and other portions of the system. Further, the control system may control, instruct, or coordinate operations of the stations, robotic drive units, and elevators to facilitate the various processes and operations associated with barges, totes, and/or items contained therein. Further details of the control system are described herein at least with respect to FIG. 16.

Figure 12:
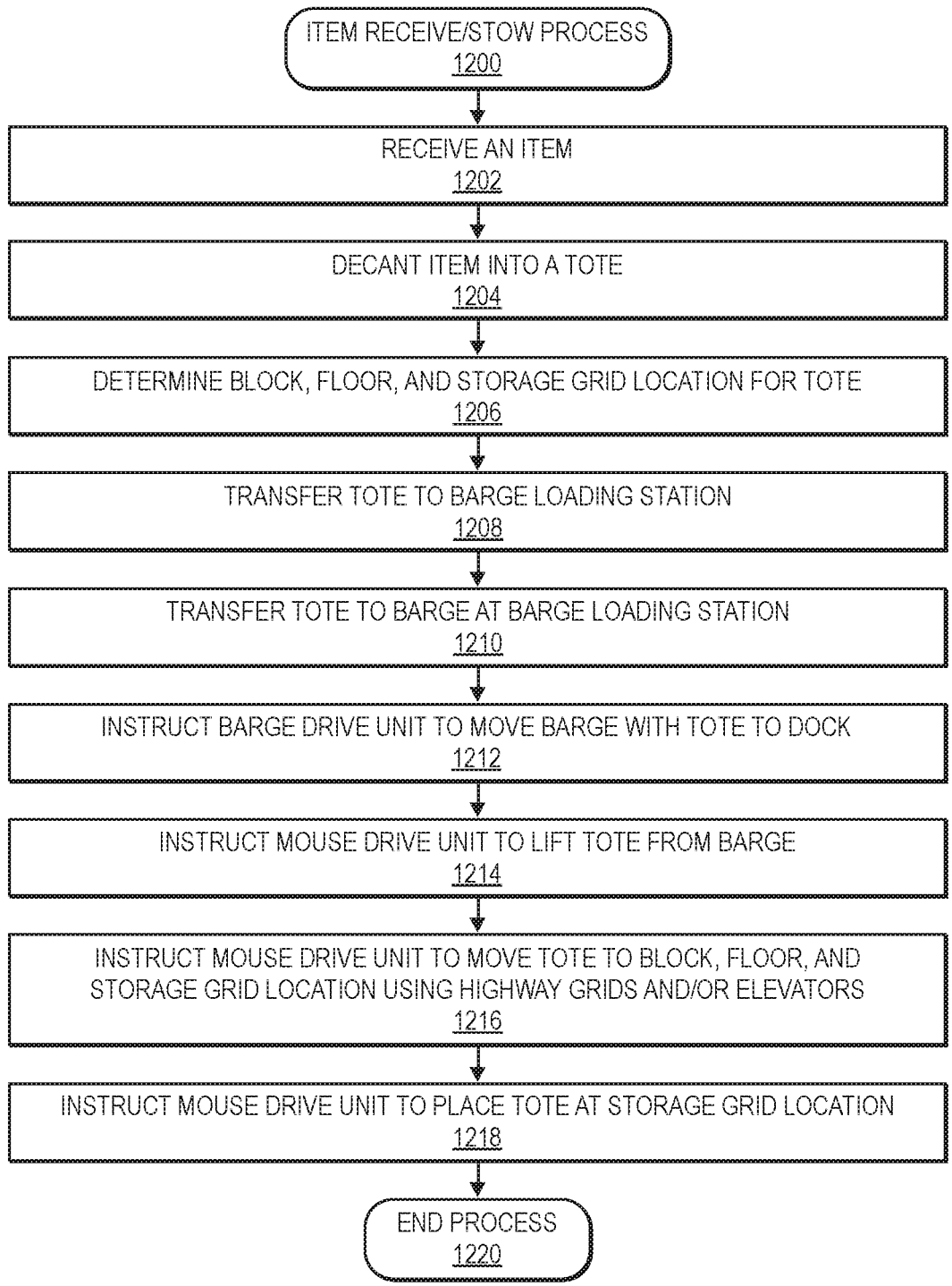
FIG. 12 is a flow diagram illustrating an example item receive/stow process, in accordance with implementations of the present disclosure.

FIG. 12 is a flow diagram illustrating an example item receive/stow process 1200, in accordance with implementations of the present disclosure.

The process 1200 may begin by receiving an item, as at 1202. For example, an item may be received at an inbound dock associated with an environment or facility utilizing a high density, robotic warehouse system. The item may be received as part of a case, pallet, box, or other group of items, and the item may be separated or removed from a case, pallet, box, or other group of items, e.g., at a palletizing/depalletizing station. An identity of the item may be determined, e.g., by scanning a barcode, QR code, label, or other identifier associated with the item, and the identity may be stored in association with the received item. In addition, the item may be received by human associates, using robotic or automated machinery, using various material handling and/or conveyance equipment, or combinations thereof. Further, a control system may instruct or command the various operations associated with receiving an item.

The process 1200 may continue by decanting the item into a tote, as at 1204. For example, the item may be sorted or separated from a plurality of received items, and the item may be decanted, moved, or placed into a tote that it configured to be utilized within a high density, robotic warehouse system. An identity of the tote may be determined, e.g., by scanning a barcode, QR code, label, or other identifier associated with the tote, and the identity of the tote may be stored in association with the received item. In addition, the item may be decanted into the tote at one or more item decant stations, e.g., by human associates, using robotic or automated machinery, using various material handling and/or conveyance equipment, or combinations thereof. Further, a control system may instruct or command the various operations associated with decanting the item into a tote.

The process 1200 may proceed by determining a block, floor, and storage grid location for the tote, as at 1206. For example, each storage grid location within a high density, robotic warehouse system may have an associated unique identifier, e.g., such as a unique fiducial marker at each storage grid location. The unique identifier of the determined or desired storage grid location may be stored in association with the identity of the tote and the received item. Further, a control system may instruct or command the various operations associated with determining a desired storage grid location for the tote.

The process 1200 may then continue to transfer the tote to a barge loading station, as at 1208. For example, the tote may be moved or conveyed from an item decant station to a barge loading station using various material handling and/or conveyance equipment. Further, a control system may instruct or command the various operations associated with transferring the tote to a barge loading station.

The process 1200 may then proceed to transfer the tote to a barge at the barge loading station, as at 1210. For example, the tote may be moved or transferred from a conveyor or other portion of the barge loading station to a location on an upper surface of a barge. An identity associated with the barge and/or the location on the upper surface of the barge may be determined, e.g., by scanning a barcode, QR code, label, or other identifier associated with the barge and/or the location on the upper surface of the barge, and the identity of the barge and/or the location on the upper surface of the barge may be stored in association with the tote and/or received item. In addition, the tote may be transferred to the upper surface of the barge, e.g., by human associates, using robotic or automated machinery, using various material handling and/or conveyance equipment, or combinations thereof. Further, a control system may instruct or command the various operations associated with transferring the tote to a barge at the barge loading station.

The process 1200 may continue with instructing a barge drive unit to move the barge with the tote to a dock, as at 1212. For example, a barge drive unit may be instructed to move to, engage, and lift the barge with the tote at the barge loading station, e.g., using a barge lift mechanism, or a barge drive unit may already be under and/or engaged with the barge with the tote at the barge loading station. Then, the barge drive unit may move the barge with the tote to a dock associated with the high density, robotic warehouse system. For example, the dock to which the barge is to be moved may be selected based at least in part on the desired block, floor, and storage grid location for the tote. In addition, by detecting, identifying, and following fiducial markers positioned along the floors, the barge drive unit may move the barge with the tote to the dock associated with the desired block, floor, and storage grid location as determined for the tote. Further, a control system may instruct or command the various operations associated with instructing the barge drive unit to move the barge with the tote to a dock associated with the high density, robotic warehouse system.

The process 1200 may proceed with instructing a mouse drive unit to lift the tote from the barge, as at 1214. For example, a mouse drive unit associated with the high density, robotic warehouse system may move to the dock, onto the upper surface of the barge at the dock, and to the location of the tote on the upper surface of the barge under the tote. For example, by detecting, identifying, and following fiducial markers positioned along the highway grids, elevators, docks, and/or an upper surface of the barge associated with the high density, robotic warehouse system, the mouse drive unit may move to the dock and onto the barge to lift the tote. Then, the mouse drive unit may engage and lift the tote from the upper surface of the barge using a tote lift mechanism, in order to move the tote into the high density, robotic warehouse system. Further, a control system may instruct or command the various operations associated with instructing the mouse drive unit to move onto the barge and lift the tote from the upper surface of the barge.

The process 1200 may then continue by instructing the mouse drive unit to move the tote to the block, floor, and storage grid location using the highway grids and/or elevators, as at 1216. For example, by detecting, identifying, and following fiducial markers positioned along the highway grids, elevators, and/or docks, the mouse drive unit may move the tote to the desired block, floor, and storage grid location as determined for the tote. Further, a control system may instruct or command the various operations associated with instructing the mouse drive unit to move the tote to the desired storage grid location.

The process 1200 may then proceed by instructing the mouse drive unit to place the tote at the storage grid location, as at 1218. For example, when the mouse drive unit is positioned at the fiducial marker associated with the desired storage grid location, the mouse drive unit may disengage, lower, and place the tote at the desired storage grid location using the tote lift mechanism. As described herein, the unique identifier of the desired storage grid location may be stored in association with the identity of the tote and the received item, in order to facilitate later retrieval of the tote and the item from the storage grid location. Further, a control system may instruct or command the various operations associated with instructing the mouse drive unit to place the tote at the desired storage grid location.

The process 1200 may then end, as at 1220.

Figure 13A:
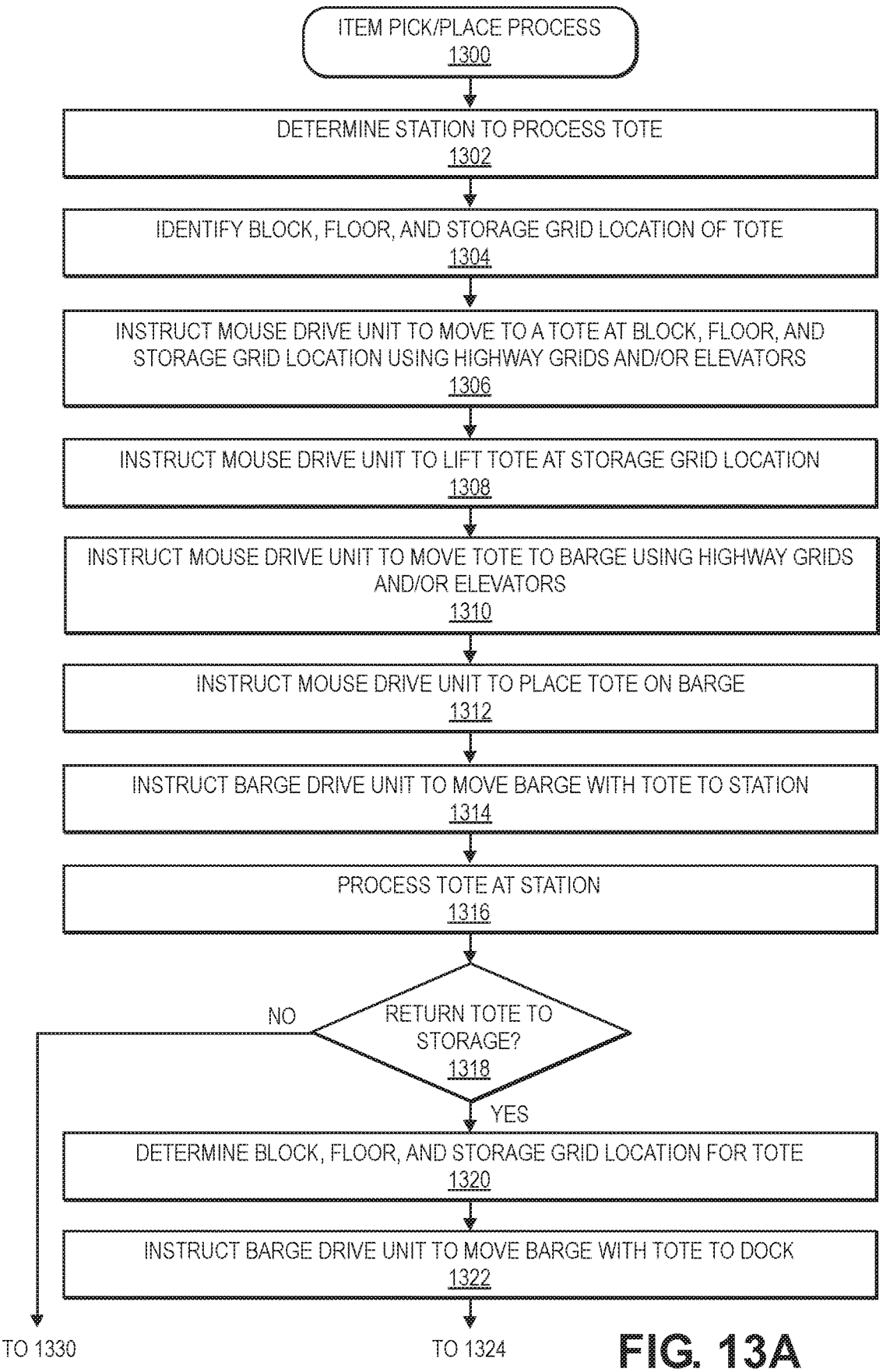
FIGS. 13A and 13B is a flow diagram illustrating an example item pick/place process, in accordance with implementations of the present disclosure.
Figure 13B:
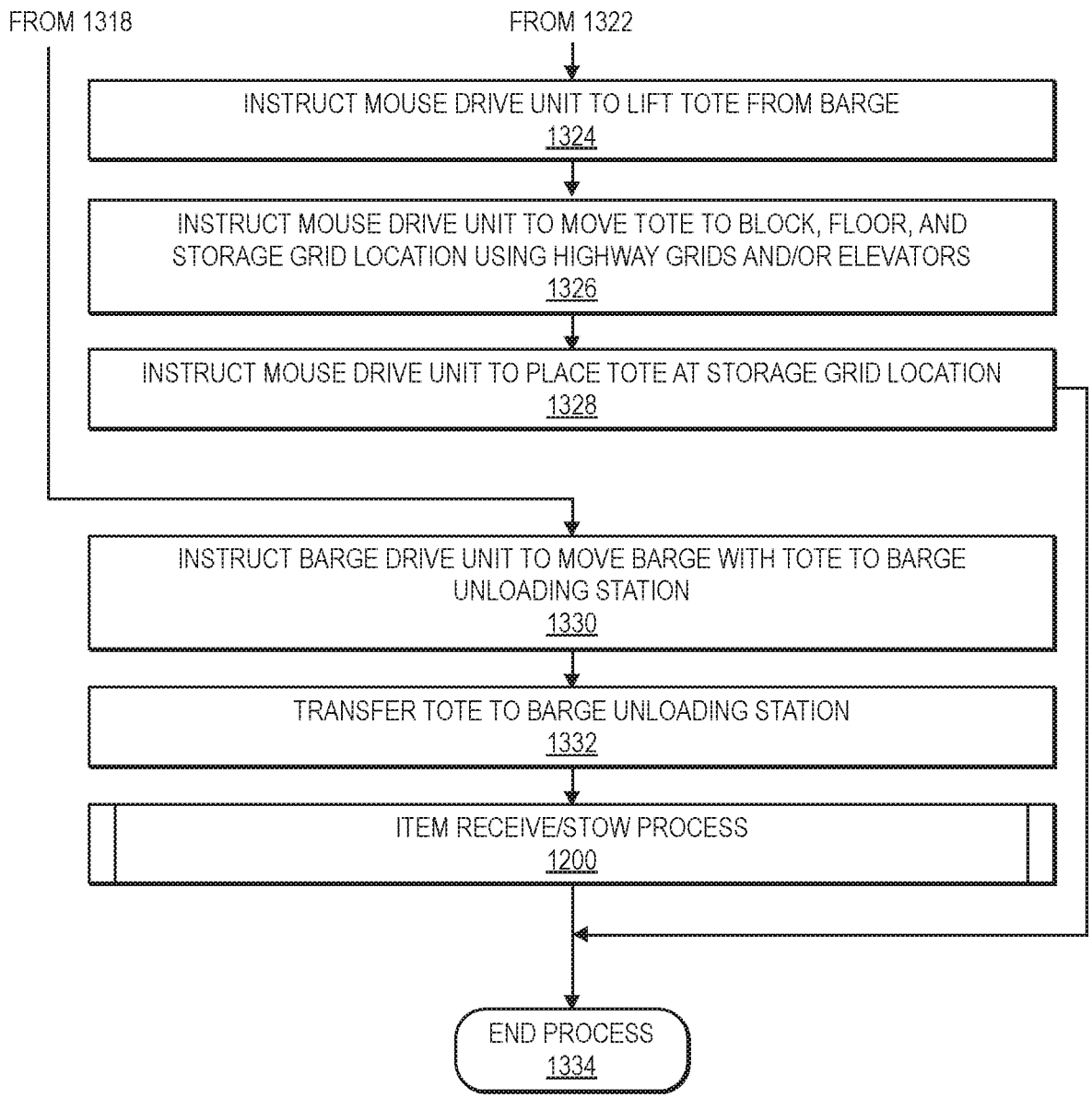

FIGS. 13A and 13B is a flow diagram illustrating an example item pick/place process 1300, in accordance with implementations of the present disclosure.

The process 1300 may begin by identifying a station to process a tote, as at 1302. For example, an item processing station may be selected to process a desired tote and/or items contained therein from among a plurality of item processing stations. As described herein, an item processing station may pick and place, or otherwise process, one or more items contained in a tote for various downstream operations, such as transporting transship totes, packing and shipping customer orders, or other operations or processes. Further, a control system may instruct or command the various operations associated with identifying an item processing station to process a desired tote.

The process 1300 may continue by identifying a block, floor, and storage grid location of the tote, as at 1304. For example, each storage grid location within a high density, robotic warehouse system may have an associated unique identifier, e.g., such as a unique fiducial marker at each storage grid location. The unique identifier of the storage grid location may be stored in association with the identity of the desired tote and/or items contained therein. Further, a control system may instruct or command the various operations associated with identifying a storage grid location of the desired tote.

The process 1300 may proceed by instructing a mouse drive unit to move to the tote at the block, floor, and storage grid location using the highway grids and/or elevators, as at 1306. For example, by detecting, identifying, and following fiducial markers positioned along the highway grids, elevators, and/or docks, the mouse drive unit may move to the desired tote at the block, floor, and storage grid location as identified for the desired tote. Further, a control system may instruct or command the various operations associated with instructing the mouse drive unit to move to the desired tote at the storage grid location.

The process 1300 may continue to instruct the mouse drive unit to lift the tote at the storage grid location, as at 1308. For example, when the mouse drive unit is positioned at the storage grid location under the desired tote, the mouse drive unit may engage and lift the desired tote using a tote lift mechanism. Further, a control system may instruct or command the various operations associated with instructing the mouse drive unit to lift the desired tote.

The process 1300 may proceed to instruct the mouse drive unit to move the tote to a barge using the highway grids and/or elevators, as at 1310. For example, the dock and the barge to which the tote is to be moved may be selected based at least in part on the desired station to process the tote. In addition, by detecting, identifying, and following fiducial markers positioned along the highway grids, elevators, docks, and/or an upper surface of the barge, the mouse drive unit may move the tote to a location on the upper surface of the barge at the dock as determined for the tote. An identity associated with the barge and/or the location on the upper surface of the barge may be determined, e.g., by scanning a barcode, QR code, label, or other identifier associated with the barge and/or the location on the upper surface of the barge, and the identity of the barge and/or the location on the upper surface of the barge may be stored in association with the retrieved tote and/or item. Further, a control system may instruct or command the various operations associated with instructing the mouse drive unit to move the tote to the upper surface of the barge at the dock.

The process 1300 may continue with instructing the mouse drive unit to place the tote on the barge, as at 1312. For example, when the mouse drive unit is positioned at the location on the upper surface of the barge, e.g., based on a fiducial marker associated with the upper surface of the barge, the mouse drive unit may disengage, lower, and place the tote at the location on the upper surface of the barge using the tote lift mechanism. As described herein, the unique identifier of the barge and/or the location on the upper surface of the barge may be stored in association with the identity of the retrieved tote and/or item. Further, a control system may instruct or command the various operations associated with instructing the mouse drive unit to place the tote on the barge.

The process 1300 may proceed with instructing a barge drive unit to move the barge with the tote to the station, as at 1314. For example, a barge drive unit may be instructed to move to, engage, and lift the barge with the tote at the dock, e.g., using a barge lift mechanism, or a barge drive unit may already be under and/or engaged with the barge with the tote at the dock. Then, the barge drive unit may move the barge with the tote to the desired item processing station to process the tote and/or items contained therein. In addition, by detecting, identifying, and following fiducial markers positioned along the floors, the barge drive unit may move the barge with the tote to the desired item processing station within the environment as determined for the tote. Further, a control system may instruct or command the various operations associated with instructing the barge drive unit to move the barge with the tote from a dock of the high density, robotic warehouse system to an item processing station within the environment.

The process 1300 may then continue by processing the tote at the station, as at 1316. For example, one or more items contained within the tote may be processed at the item processing station, e.g., to pick one or more items from the tote, to place one or more items into transship totes or order totes, and/or to facilitate various other downstream operations. Identities of the tote from which an item was picked, the item itself, and a tote into which the item was placed may be determined, e.g., by scanning a barcode, QR code, label, or other identifier associated with the totes and the item, and the identities of the totes and the item may be stored or updated in association with the item. In addition, the item may be processed at the item processing station, e.g., by human associates, using robotic or automated machinery, using various material handling and/or conveyance equipment, or combinations thereof. Further, a control system may instruct or command the various operations associated with processing the tote and/or items contained therein.

The process 1300 may then proceed by determining whether to return the tote to storage, as at 1318. For example, upon completion of processing of items contained in the tote at the item processing station, it may be determined whether the tote is still full or does not need replenishment or consolidation such that the tote should be returned back to the high density, robotic warehouse system, or if the tote is empty or depleted or in need of replenishment or consolidation such that the tote should be transferred to an item decant station to replenish or consolidate one or more items to the tote. Further, a control system may instruct or command the various operations associated with determining whether to return the tote to storage.

If, at step 1318, it is determined that the tote should be returned to storage, then the process 1300 may continue to determine a block, floor, and storage grid location for the tote, as at 1320. For example, each storage grid location within a high density, robotic warehouse system may have an associated unique identifier, e.g., such as a unique fiducial marker at each storage grid location. The unique identifier of the determined or desired storage grid location may be stored in association with the identity of the tote and items contained therein. Further, a control system may instruct or command the various operations associated with determining a desired storage grid location for the tote.

The process 1300 may proceed to instruct a barge drive unit to move the barge with the tote to a dock, as at 1322. For example, a barge drive unit may be instructed to move to, engage, and lift the barge with the tote at the item processing station, e.g., using a barge lift mechanism, or a barge drive unit may already be under and/or engaged with the barge with the tote at the item processing station. Then, the barge drive unit may move the barge with the tote to a dock associated with the high density, robotic warehouse system. For example, the dock to which the barge is to be moved may be selected based at least in part on the desired block, floor, and storage grid location for the tote. In addition, by detecting, identifying, and following fiducial markers positioned along the floors, the barge drive unit may move the barge with the tote to the dock associated with the desired block, floor, and storage grid location as determined for the tote. Further, a control system may instruct or command the various operations associated with instructing the barge drive unit to move the barge with the tote to a dock associated with the high density, robotic warehouse system.

The process 1300 may continue with instructing a mouse drive unit to lift the tote from the barge, as at 1324. For example, a mouse drive unit associated with the high density, robotic warehouse system may move to the dock, onto the upper surface of the barge at the dock, and to the location of the tote on the upper surface of the barge under the tote. For example, by detecting, identifying, and following fiducial markers positioned along the highway grids, elevators, docks, and/or an upper surface of the barge associated with the high density, robotic warehouse system, the mouse drive unit may move to the dock and onto the barge to lift the tote. Then, the mouse drive unit may engage and lift the tote from the upper surface of the barge using a tote lift mechanism, in order to move the tote into the high density, robotic warehouse system. Further, a control system may instruct or command the various operations associated with instructing the mouse drive unit to move onto the barge and lift the tote from the upper surface of the barge.

The process 1300 may proceed with instructing the mouse drive unit to move the tote to the block, floor, and storage grid location using the highway grids and/or elevators, as at 1326. For example, by detecting, identifying, and following fiducial markers positioned along the highway grids, elevators, and/or docks, the mouse drive unit may move the tote to the desired block, floor, and storage grid location as determined for the tote. Further, a control system may instruct or command the various operations associated with instructing the mouse drive unit to move the tote to the desired storage grid location.

The process 1300 may then continue by instructing the mouse drive unit to place the tote at the storage grid location, as at 1328. For example, when the mouse drive unit is positioned at the fiducial marker associated with the desired storage grid location, the mouse drive unit may disengage, lower, and place the tote at the desired storage grid location using the tote lift mechanism. As described herein, the unique identifier of the desired storage grid location may be stored in association with the identity of the tote and items contained therein, in order to facilitate later retrieval of the tote and the items from the storage grid location. Further, a control system may instruct or command the various operations associated with instructing the mouse drive unit to place the tote at the desired storage grid location.

If, however, at step 1318, it is determined that the tote should not be returned to storage, then the process 1300 may proceed by instructing a barge drive unit to move the barge with the tote to a barge unloading station, as at 1330. For example, a barge drive unit may be instructed to move to, engage, and lift the barge with the tote at the item processing station, e.g., using a barge lift mechanism, or a barge drive unit may already be under and/or engaged with the barge with the tote at the item processing station. Then, the barge drive unit may move the barge with the tote to a barge unloading station to unload or remove the tote from the barge. In addition, by detecting, identifying, and following fiducial markers positioned along the floors, the barge drive unit may move the barge with the tote to the barge unloading station within the environment as determined for the tote. Further, a control system may instruct or command the various operations associated with instructing the barge drive unit to move the barge with the tote to a barge unloading station within the environment.

The process 1300 may then continue to transfer the tote to the barge unloading station, as at 1332. For example, the tote may be moved or transferred from a location on an upper surface of the barge to a conveyor or other portion of the barge unloading station. In addition, the tote may be transferred from the upper surface of the barge, e.g., by human associates, using robotic or automated machinery, using various material handling and/or conveyance equipment, or combinations thereof. Further, a control system may instruct or command the various operations associated with transferring the tote from a barge at the barge unloading station.

Then, the process 1300 may proceed to perform the item receive/stow process 1200, as described with respect to FIG. 12, in order to replenish or consolidate items to the empty or depleted tote and store additional totes with items in the high density, robotic warehouse system for later retrieval and various downstream operations.

The process 1300 may then end, as at 1334.

Figure 14:
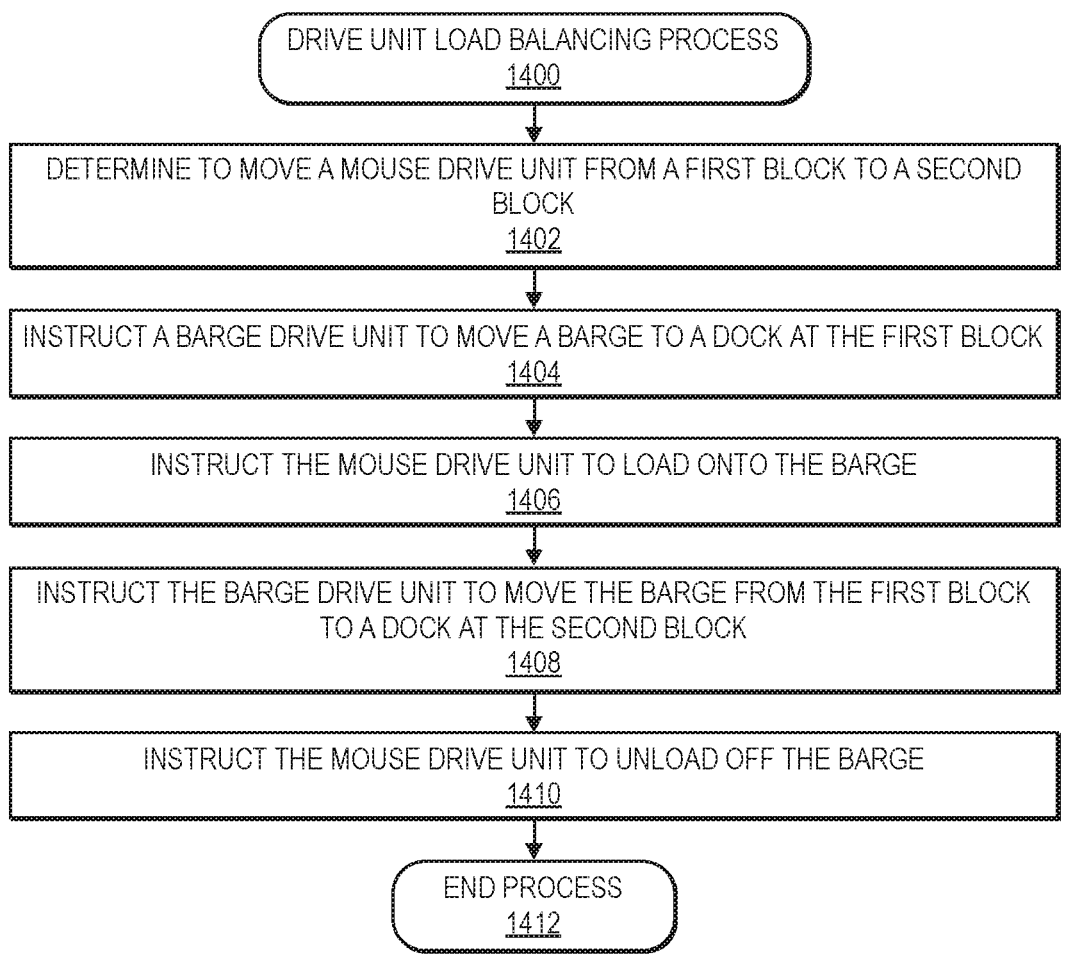
FIG. 14 is a flow diagram illustrating an example drive unit load balancing process, in accordance with implementations of the present disclosure.

FIG. 14 is a flow diagram illustrating an example drive unit load balancing process 1400, in accordance with implementations of the present disclosure.

The process 1400 may begin by determining to move a mouse drive unit from a first block to a second block, as at 1402. For example, one or more mouse drive units may move between different blocks, or different rows of connected blocks, in order to modify or adjust various operational parameters of portions of the high density, robotic warehouse system, such as throughput, efficiency, load balancing, or other characteristics of portions of the high density, robotic warehouse system. Further, a control system may instruct or command the various operations associated with determining to move a mouse drive unit from a first block to a second block.

The process 1400 may continue by instructing a barge drive unit to move a barge to a dock at the first block, as at 1404. For example, a barge drive unit may be instructed to move to, engage, and lift a barge, e.g., using a barge lift mechanism, or a barge drive unit may already be under and/or engaged with a barge. Then, the barge drive unit may move the barge to the dock associated with the first block of the high density, robotic warehouse system. In addition, by detecting, identifying, and following fiducial markers positioned along the floors, the barge drive unit may move the barge to the first block. Further, a control system may instruct or command the various operations associated with instructing the barge drive unit to move the barge to the dock at the first block of the high density, robotic warehouse system.

The process 1400 may proceed by instructing the mouse drive unit to load onto the barge, as at 1406. For example, by detecting, identifying, and following fiducial markers positioned along the highway grids, elevators, docks, and/or an upper surface of the barge, the mouse drive unit may move to a location on the upper surface of the barge at the dock of the first block. An identity associated with the barge and/or the location on the upper surface of the barge may be determined, e.g., by scanning a barcode, QR code, label, or other identifier associated with the barge and/or the location on the upper surface of the barge, and the identity of the barge and/or the location on the upper surface of the barge may be stored in association with the mouse drive unit. Further, a control system may instruct or command the various operations associated with instructing the mouse drive unit to load onto the upper surface of the barge at the dock of the first block.

The process 1400 may continue to instruct the barge drive unit to move the barge from the first block to a dock at the second block, as at 1408. For example, a barge drive unit may be instructed to move to, engage, and lift the barge with the mouse drive unit, e.g., using a barge lift mechanism, or a barge drive unit may already be under and/or engaged with the barge with the mouse drive unit. Then, the barge drive unit may move the barge with the mouse drive unit to a dock associated with the second block of the high density, robotic warehouse system. In addition, by detecting, identifying, and following fiducial markers positioned along the floors, the barge drive unit may move the barge from the first block to the second block. Further, a control system may instruct or command the various operations associated with instructing the barge drive unit to move the barge from the first block to a dock at the second block of the high density, robotic warehouse system.

The process 1400 may proceed to instruct the mouse drive unit to unload off the barge, as at 1410. For example, by detecting, identifying, and following fiducial markers positioned along the highway grids, elevators, docks, and/or an upper surface of the barge, the mouse drive unit may move off the location on the upper surface of the barge at the dock and into the second block. The mouse drive unit may then perform various operations within the second block, which may be substantially similar to various operations that were previously performed by the mouse drive unit within the first block. Further, a control system may instruct or command the various operations associated with instructing the mouse drive unit to unload off the upper surface of the barge at the dock of the second block.

The process 1400 may then end, as at 1412.

In further example embodiments, during movement of one or more mouse drive units between different blocks or portions of the high density, robotic warehouse system, one or more totes and items contained therein may also be simultaneously moved between different blocks or portions of the high density, robotic warehouse system, e.g., in order to modify or adjust various operational parameters of portions of the high density, robotic warehouse system, such as throughput, efficiency, load balancing, or other characteristics of portions of the high density, robotic warehouse system.

In still further example embodiments, the movement of one or more mouse drive units upon barges by barge drive units may also be utilized to remove one or more mouse drive units from operation within the high density, robotic warehouse system, e.g., to perform service or maintenance upon the mouse drive units, or to otherwise modify or adjust operational parameters of portions of the high density, robotic warehouse system. In similar manner, the movement of one or more mouse drive units upon barges by barge drive units may also be utilized to add one or more mouse drive units into operation within the high density, robotic warehouse system, e.g., after performing service or maintenance upon the mouse drive units, or to otherwise modify or adjust operational parameters of portions of the high density, robotic warehouse system.

In other example embodiments, the number, placement, arrangement, or operation of barge drive units within an environment utilizing a high density, robotic warehouse system may also be modified, e.g., by adding, removing, transferring, moving, consolidating, dispersing, or otherwise adjusting operations of barge drive units, in order to modify or adjust various operational parameters of the environment utilizing the high density, robotic warehouse system, such as throughput, efficiency, load balancing, or other characteristics of the environment utilizing the high density, robotic warehouse system.

Figure 15:
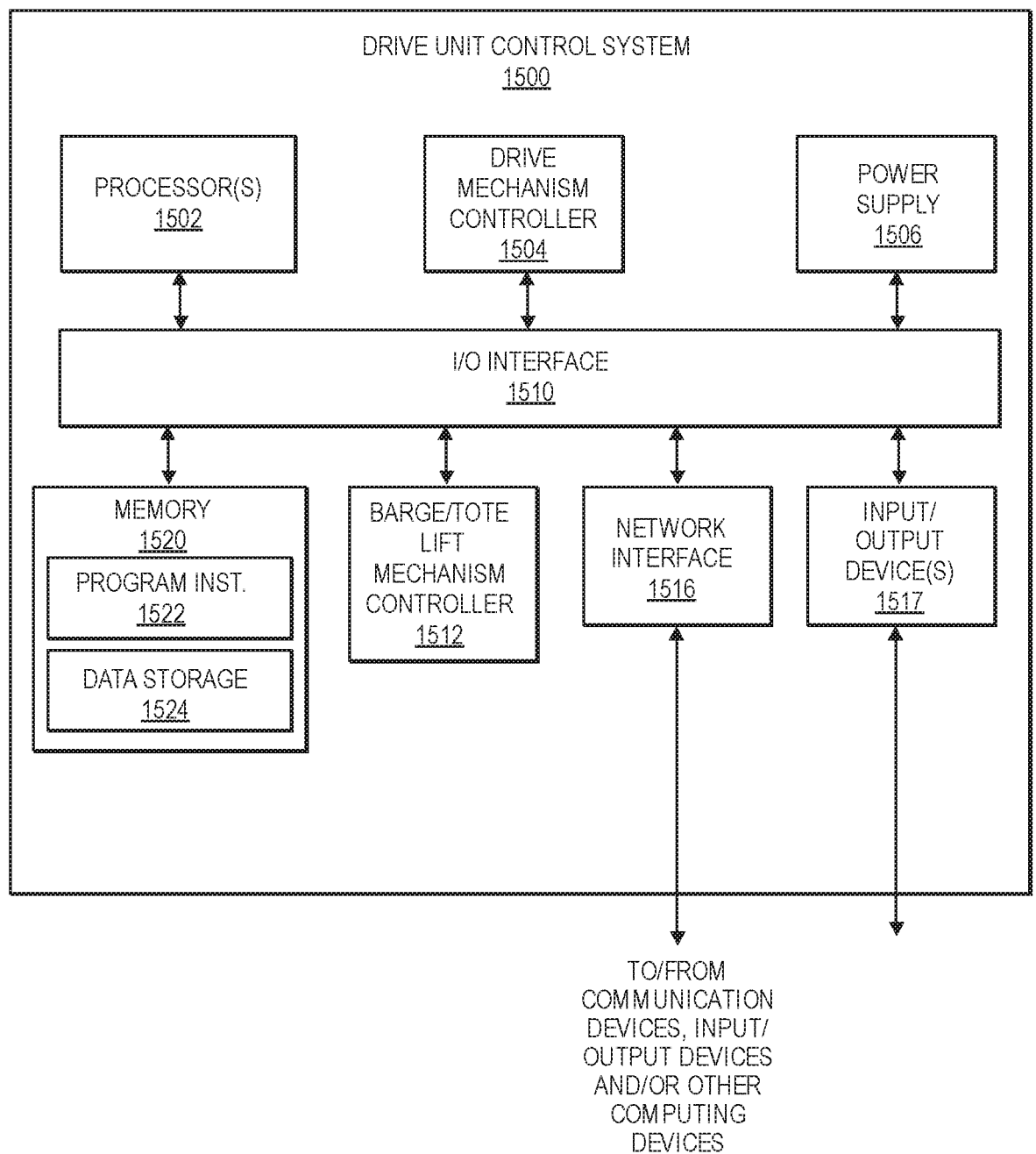
FIG. 15 is a block diagram illustrating various components of an example drive unit control system, in accordance with implementations of the present disclosure.

FIG. 15 is a block diagram illustrating various components of an example drive unit control system 1500, in accordance with implementations of the present disclosure.

In various examples, the block diagram may be illustrative of one or more aspects of a robotic drive unit controller or control system 1500 that may be used to implement the various systems and processes discussed above. In the illustrated implementation, the drive unit control system 1500 includes one or more processors 1502, coupled to a non-transitory computer readable storage medium 1520 via an input/output (I/O) interface 1510. The drive unit control system 1500 may also include a drive mechanism controller 1504 and a power supply or battery 1506. The drive unit control system 1500 may further include a barge/tote lift mechanism controller 1512, a network interface 1516, and one or more input/output devices 1517.

In various implementations, the drive unit control system 1500 may be a uniprocessor system including one processor 1502, or a multiprocessor system including several processors 1502 (e.g., two, four, eight, or another suitable number). The processor(s) 1502 may be any suitable processor capable of executing instructions. For example, in various implementations, the processor(s) 1502 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1502 may commonly, but not necessarily, implement the same ISA.

The non-transitory computer readable storage medium 1520 may be configured to store executable instructions, applications, drivers, and/or data, such as drive unit data, tote data, item data, barge data, path or destination data, position or location data, fiducial marker data, block, floor, dock, and/or storage grid location data, drive mechanism data, barge/tote lift mechanism data, elevator data, station data, sensor data, and/or other data items accessible by the processor(s) 1502. In various implementations, the non-transitory computer readable storage medium 1520 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1520 as program instructions 1522 and data storage 1524. In other implementations, program instructions, applications, drivers, and/or data may be received, sent or stored upon different types of computer-accessible media, such as non-transitory media, or on similar media separate from the non-transitory computer readable storage medium 1520 or the drive unit control system 1500.

Generally, a non-transitory, computer readable storage medium may include storage media or memory media such as magnetic or optical media, e.g., disk or CD/DVD-ROM, coupled to the drive unit control system 1500 via the I/O interface 1510. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1516.

In one implementation, the I/O interface 1510 may be configured to coordinate I/O traffic between the processor(s) 1502, the non-transitory computer readable storage medium 1520, and any peripheral devices, the network interface 1516 or other peripheral interfaces, such as input/output devices 1517. In some implementations, the I/O interface 1510 may perform any necessary protocol, timing or other data transformations to convert data signals from one component (e.g., non-transitory computer readable storage medium 1520) into a format suitable for use by another component (e.g., processor(s) 1502). In some implementations, the I/O interface 1510 may include support for devices attached through various types of peripheral buses, such as a variant of the Peripheral Component Interconnect (PCI) bus standard or the Universal Serial Bus (USB) standard, for example. In some implementations, the function of the I/O interface 1510 may be split into two or more separate components, such as a north bridge and a south bridge, for example. Also, in some implementations, some or all of the functionality of the I/O interface 1510, such as an interface to the non-transitory computer readable storage medium 1520, may be incorporated directly into the processor(s) 1502.

The drive mechanism controller 1504 may communicate with the processor(s) 1502, the non-transitory computer readable storage medium 1520, and/or other components described herein to adjust the operational characteristics of motors or other actuators associated with each drive mechanism to move the drive unit along a determined path to a destination and/or to perform other navigational maneuvers or operations.

The drive unit control system 1500 may also include a barge/tote lift mechanism controller 1512 that communicates with the processor(s) 1502, the non-transitory computer readable storage medium 1520, and/or other components described herein to engage, lift, move, lower, disengage, and/or place respective barges carried by barge drive units, and to engage, lift, move, lower, disengage, and/or place respective totes carried by mouse drive units.

The network interface 1516 may be configured to allow data to be exchanged between the drive unit control system 1500, other devices attached to a network, such as other computer systems, high density, robotic warehouse system controllers, elevators, stations, control systems of other drive units, and/or other vehicles, systems, machines, equipment, apparatuses, systems, sensors, or devices associated with the high density, robotic warehouse system and/or the environment utilizing the high density, robotic warehouse system. For example, the network interface 1516 may enable wireless communication between numerous drive units. In various implementations, the network interface 1516 may support communication via wireless general data networks, such as a Wi-Fi network. For example, the network interface 1516 may support communication via telecommunications networks such as cellular communication networks, satellite networks, and the like.

Input/output devices 1517 may, in some implementations, include one or more visual input/output devices, audio input/output devices, displays, imaging sensors, thermal sensors, infrared sensors, time of flight sensors, accelerometers, various other sensors described herein, etc. Multiple input/output devices 1517 may be present and controlled by the drive unit control system 1500. One or more of these sensors may be utilized to assist in performing the various functions, operations, and processes described herein.

As shown in FIG. 15, the memory may include program instructions 1522 which may be configured to implement the example processes and/or sub-processes described above. The data storage 1524 may include various data stores for maintaining data items that may be provided for performing the various functions, operations, and processes described herein. For example, the data storage 1524 may include drive unit data, tote data, item data, barge data, path or destination data, position or location data, fiducial marker data, block, floor, dock, and/or storage grid location data, drive mechanism data, barge/tote lift mechanism data, elevator data, station data, sensor data, and/or other data items.

Those skilled in the art will appreciate that the drive unit control system 1500 is merely illustrative and is not intended to limit the scope of the present disclosure. In particular, the computing system and devices may include any combination of hardware or software that can perform the indicated functions, including other control systems or controllers, computers, network devices, robotic devices, etc. The drive unit control system 1500 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Figure 16:
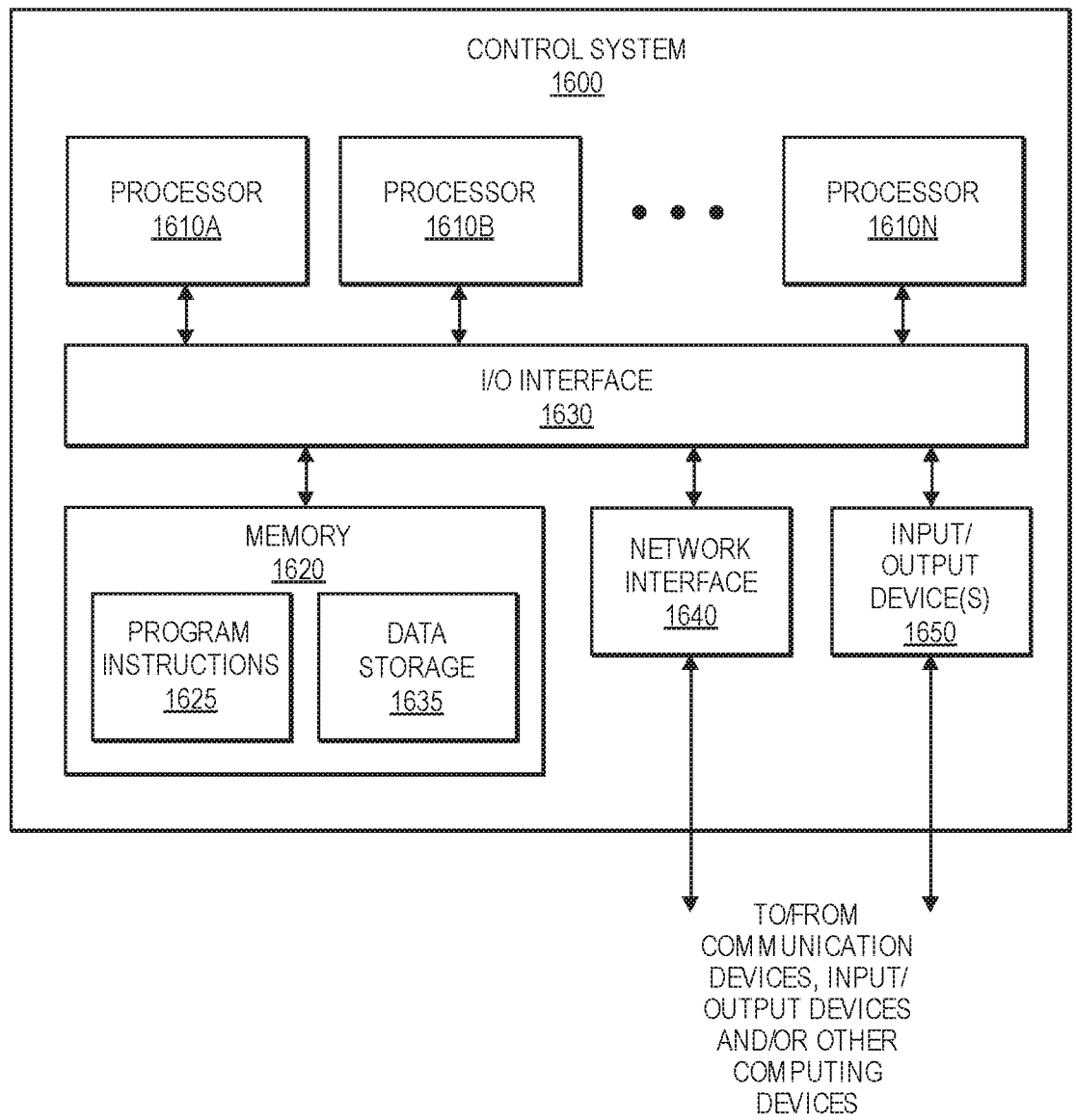
FIG. 16 is a block diagram illustrating various components of an example control system, in accordance with implementations of the present disclosure.

FIG. 16 is a block diagram illustrating various components of an example control system 1600, in accordance with implementations of the present disclosure.

Various operations of a control system or controller 1600, such as those described herein, may be executed on one or more computer systems, and/or interacting with various other computers, systems, or devices of a high density, robotic warehouse system, according to various implementations. For example, the control system or controller 1600 discussed above may function and operate on one or more computer systems. In the illustrated implementation, a control system 1600 includes one or more processors 1610A, 1610B through 1610N, coupled to a non-transitory computer-readable storage medium 1620 via an input/output (I/O) interface 1630. The control system 1600 further includes a network interface 1640 coupled to the I/O interface 1630, and one or more input/output devices 1650. In some implementations, it is contemplated that a described implementation may be implemented using a single instance of the control system 1600 while, in other implementations, multiple such systems or multiple nodes making up the control system 1600 may be configured to host different portions or instances of the described implementations. For example, in one implementation, some data sources or services (e.g., related to portions of the high density, robotic warehouse systems, operations, or processes, etc.) may be implemented via one or more nodes of the control system 1600 that are distinct from those nodes implementing other data sources or services (e.g., related to other portions of the high density, robotic warehouse systems, operations, or processes, etc.).

In various implementations, the control system 1600 may be a uniprocessor system including one processor 1610A, or a multiprocessor system including several processors 1610A-1610N (e.g., two, four, eight, or another suitable number). The processors 1610A-1610N may be any suitable processor capable of executing instructions. For example, in various implementations, the processors 1610A-1610N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1610A-1610N may commonly, but not necessarily, implement the same ISA.

The non-transitory computer-readable storage medium 1620 may be configured to store executable instructions and/or data accessible by the one or more processors 1610A-1610N. In various implementations, the non-transitory computer-readable storage medium 1620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1620 as program instructions 1625 and data storage 1635, respectively. In other implementations, program instructions and/or data may be received, sent or stored upon different types of computer-accessible media, such as non-transitory media, or on similar media separate from the non-transitory computer-readable storage medium 1620 or the control system 1600. Generally speaking, a non-transitory, computer-readable storage medium may include storage media or memory media such as magnetic or optical media, e.g., disk or CD/DVD-ROM, coupled to the control system 1600 via the I/O interface 1630. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1640.

In one implementation, the I/O interface 1630 may be configured to coordinate I/O traffic between the processors 1610A-1610N, the non-transitory computer-readable storage medium 1620, and any peripheral devices, including the network interface 1640 or other peripheral interfaces, such as input/output devices 1650. In some implementations, the I/O interface 1630 may perform any necessary protocol, timing or other data transformations to convert data signals from one component (e.g., non-transitory computer-readable storage medium 1620) into a format suitable for use by another component (e.g., processors 1610A-1610N). In some implementations, the I/O interface 1630 may include support for devices attached through various types of peripheral buses, such as a variant of the Peripheral Component Interconnect (PCI) bus standard or the Universal Serial Bus (USB) standard, for example. In some implementations, the function of the I/O interface 1630 may be split into two or more separate components, such as a north bridge and a south bridge, for example. Also, in some implementations, some or all of the functionality of the I/O interface 1630, such as an interface to the non-transitory computer-readable storage medium 1620, may be incorporated directly into the processors 1610A-1610N.

The network interface 1640 may be configured to allow data to be exchanged between the control system 1600 and other devices attached to a network, such as other computer systems, material handling system controllers, warehouse, retail, or facility management systems, other robotic warehouse system control systems, control systems of drive units, stations, various types of sensors, upstream stations or processes, downstream stations or processes, other material handling systems or equipment, or between nodes of the control system 1600. In various implementations, the network interface 1640 may support communication via wired or wireless general data networks, such as any suitable type of Ethernet network.

Input/output devices 1650 may, in some implementations, include one or more displays, projection devices, visual input/output devices, audio input/output devices, keyboards, keypads, touchpads, scanning devices, imaging devices, sensors, photo eyes, proximity sensors, RFID readers, voice or optical recognition devices, various other sensors described herein, or any other devices suitable for entering or retrieving data by one or more control systems 1600. Multiple input/output devices 1650 may be present in the control system 1600 or may be distributed on various nodes of the control system 1600. In some implementations, similar input/output devices may be separate from the control system 1600 and may interact with one or more nodes of the control system 1600 through a wired or wireless connection, such as over the network interface 1640.

As shown in FIG. 16, the memory 1620 may include program instructions 1625 that may be configured to implement one or more of the described implementations and/or provide data storage 1635, which may comprise various tables, data stores and/or other data structures accessible by the program instructions 1625. The program instructions 1625 may include various executable instructions, programs, or applications to facilitate high density, robotic warehouse systems, operations, and processes described herein, such as station controllers, drivers, or applications, elevator controllers, drivers, or applications, drive unit controllers, drivers, or applications, drive unit path and destination determination controllers, drivers, or applications, sensor controllers, drivers, or applications, sensor data processing applications, material handling equipment controllers, drivers, or applications, etc. The data storage 1635 may include various data stores for maintaining data related to high density, robotic warehouse systems, operations, or processes described herein, such as station data, elevator data, drive unit data, tote data, item data, barge data, path or destination data, position or location data, fiducial marker data, block, floor, dock, and/or storage grid location data, drive mechanism data, barge/tote lift mechanism data, sensor data, other material handling equipment or apparatus data, and/or other data items.

Those skilled in the art will appreciate that the control system 1600 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1600 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 12-14, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A warehouse storage system, comprising:
   a plurality of floors, individual floors including a plurality of storage grid locations connected via a plurality of highway grids, a lowest floor of the plurality of floors including a plurality of docks;
   a plurality of elevators connecting the plurality of floors;
   a plurality of totes, individual totes being positioned at respective storage grid locations, and individual totes being configured to receive respective items;
   a plurality of barge drive units configured to move to respective docks of the plurality of docks, individual barge drive units configured to lift, move, and place barges that carry a respective plurality of totes between the respective docks and a plurality of processing stations; and
   a plurality of mouse drive units configured to traverse upper surfaces of respective barges, the plurality of floors, the plurality of storage grid locations, and the plurality of docks via the plurality of highway grids and the plurality of elevators, individual mouse drive units configured to lift, move, and place respective totes.

2. The warehouse storage system of claim 1, wherein respective heights of the individual floors are configured to enable lifting, movement, and placement of respective totes by the individual mouse drive units.

3. The warehouse storage system of claim 1, wherein the plurality of processing stations include at least one of a barge loading station, an item processing station, or a barge unloading station.

4. The warehouse storage system of claim 1, further comprising:
   a plurality of service access zones associated with the warehouse storage system, the plurality of service access zones configured to enable access to substantially all of the plurality of floors, the plurality of storage grid locations, the plurality of highway grids, and the plurality of elevators.

5. A system, comprising:
   a first robotic drive unit configured to move a barge, an upper surface of the barge configured to receive a plurality of totes;
   wherein the first robotic drive unit is configured to move the barge between at least one station and a dock of a storage system; and
   a second robotic drive unit configured to move a respective tote within the storage system;
   wherein the second robotic drive unit is configured to traverse the upper surface of the barge to move the respective tote between the upper surface of the barge at the dock and the storage system.

6. The system of claim 5, further comprising:
   the storage system comprising:
      a plurality of floors, individual floors including a plurality of storage grid locations and a plurality of highway grids, individual storage grid locations configured to receive respective totes, and a lowest floor of the plurality of floors including the dock; and
      at least one elevator traversing the plurality of floors;
   wherein the second robotic drive unit is further configured to traverse the plurality of floors, the plurality of storage grid locations, and the dock via the plurality of highway grids and the at least one elevator.

7. The system of claim 6, wherein the storage system further comprises:
   at least one service access zone configured to enable access to substantially all of the plurality of floors, the plurality of storage grid locations, the plurality of highway grids, and the at least one elevator.

8. The system of claim 6, wherein the storage system further comprises:
   a plurality of docks associated with a periphery of the lowest floor of the plurality of floors, the plurality of docks including the dock;
   wherein the lowest floor of the plurality of floors includes a first number of storage grid locations; and
   wherein upper floors of the plurality of floors each include a second number of storage grid locations.

9. The system of claim 6, wherein respective heights of the individual floors are configured to enable movement of the respective tote by the second robotic drive unit.

10. The system of claim 6, wherein the respective tote includes a plurality of legs;
    wherein the second robotic drive unit is configured to traverse under the respective tote between the plurality of legs; and
    wherein the second robotic drive unit is configured to lift and move the respective tote between respective storage grid locations.

11. The system of claim 6, wherein the first robotic drive unit is configured to traverse between the storage system and the at least one station using a first plurality of fiducial markers associated with a surface along which the first robotic drive unit moves; and
    wherein the second robotic drive unit is configured to traverse the plurality of storage grid locations and the dock via the plurality of highway grids and the at least one elevator using a second plurality of fiducial markers associated with the plurality of floors.

12. The system of claim 6, further comprising:
    a controller configured to at least:
       determine a desired floor and a desired storage grid location associated with the respective tote;
       instruct the first robotic drive unit to lift and move the barge to a barge loading station;

instruct loading of the respective tote onto the upper surface of the barge at the barge loading station;
instruct the first robotic drive unit to move the barge to the dock of the storage system;
instruct the second robotic drive unit to move onto the upper surface of the barge at the dock and lift the respective tote;
instruct the second robotic drive unit to move the respective tote to the desired floor and the desired storage grid location via at least a portion of the plurality of highway grids and the at least one elevator; and
instruct the second robotic drive unit to place the respective tote at the desired floor and the desired storage grid location.

13. The system of claim 12, wherein the controller is further configured to at least:
determine a respective floor and a respective storage grid location associated with the respective tote;
instruct the second robotic drive unit to move to the respective tote at the respective floor and the respective storage grid location via at least a portion of the plurality of highway grids and the at least one elevator;
instruct the second robotic drive unit to lift the respective tote;
instruct the second robotic drive unit to move the respective tote to the dock via at least a portion of the plurality of highway grids and the at least one elevator;
instruct the first robotic drive unit to lift and move the barge to the dock of the storage system;
instruct the second robotic drive unit to move the respective tote onto the upper surface of the barge at the dock and place the respective tote on the barge;
instruct the first robotic drive unit to move the barge to an item processing station; and
instruct processing of an item associated with the respective tote at the item processing station.

14. The system of claim 5, further comprising:
the at least one station including at least one of a barge loading station, an item processing station, or a barge unloading station;
wherein the first robotic drive unit is configured to move the barge to the at least one station to at least one of receive a tote onto the upper surface of the barge, process an item associated with a tote, or remove a tote from the upper surface of the barge.

15. A method, comprising:
determining, by a controller, a respective floor of a plurality of floors of a storage system associated with a respective tote, the plurality of floors being connected by at least one elevator;
determining, by the controller, a respective storage grid location of a plurality of storage grid locations on the respective floor associated with the respective tote;
instructing, by the controller, a first robotic drive unit to move a barge carrying the respective tote to a dock of the storage system; and
instructing, by the controller, a second robotic drive unit to traverse an upper surface of the barge to lift the respective tote from the barge at the dock and to move the respective tote to the respective floor and the respective storage grid location via at least a portion of a plurality of highway grids and the at least one elevator.

16. The method of claim 15, further comprising:
instructing, by the controller, the second robotic drive unit to lift the respective tote from the respective storage grid location and to move the respective tote to the barge at the dock via at least a portion of the plurality of highway grids and the at least one elevator; and
instructing, by the controller, the first robotic drive unit to move the barge carrying the respective tote to at least one processing station configured to process the respective tote.

17. The method of claim 16, further comprising:
instructing, by the controller, picking of an item from the respective tote at the at least one processing station.

18. The method of claim 16, further comprising:
instructing, by the controller, removal of the respective tote from the upper surface of the barge at the at least one processing station.

19. The method of claim 16, further comprising:
instructing, by the controller, placement of a second tote onto the upper surface of the barge at the at least one processing station.

* * * * *